United States Patent
Sarkissian et al.

(10) Patent No.: US 12,417,393 B2
(45) Date of Patent: Sep. 16, 2025

(54) GENERATIVE CONTENT REGISTRATION SYSTEM AND METHOD OF USE

(71) Applicant: AI-ID, Inc., Reno, NV (US)

(72) Inventors: Shaunt M Sarkissian, Reno, NV (US); David Campbell, Morgan Hill, CA (US)

( * ) Notice: Subject to any disclaimer, the term of this patent is extended or adjusted under 35 U.S.C. 154(b) by 0 days.

(21) Appl. No.: 18/495,756

(22) Filed: Oct. 27, 2023

(65) Prior Publication Data

US 2024/0311659 A1  Sep. 19, 2024

Related U.S. Application Data

(63) Continuation-in-part of application No. 18/183,666, filed on Mar. 14, 2023.

(60) Provisional application No. 63/496,700, filed on Apr. 18, 2023.

(51) Int. Cl.
*G06F 16/00* (2019.01)
*G06N 5/04* (2023.01)

(52) U.S. Cl.
CPC ..................... *G06N 5/04* (2013.01)

(58) Field of Classification Search
CPC ........ G06N 20/00; G06N 20/10; G06N 3/126; G06N 20/20; G06N 3/044; G06N 3/045; G06N 3/08; G06N 5/01; G06N 5/022; G06N 5/048; G06N 7/01; G06N 7/023; G06N 5/02; G06N 5/04; G06F 16/245; G06F 16/283; G06F 16/285; G06F 16/55; G06F 16/9024; G06F 18/214; G06F 18/22; G06F 18/24; G06F 40/247; G06F 40/30; G06F 8/10; G06F 8/20; G06F 8/34; G06F 8/36; G06F 8/41; G06F 30/20; G06F 16/40; G06F 16/447; G06F 16/48; G06F 8/61; G06F 8/65; G06F 3/011; G06F 3/0488; G06F 7/026; G06F 16/275; G06F 16/437; G06Q 30/02; G06Q 10/10; G06Q 50/20; G06Q 50/18
See application file for complete search history.

(56) References Cited

U.S. PATENT DOCUMENTS

| | | | |
|---|---|---|---|
| 10,956,948 B2 * | 3/2021 | Mediratta | G06Q 30/0643 |
| 2022/0029803 A1 * | 1/2022 | Vijayanarayanan | H04L 9/32 |
| 2022/0286491 A1 * | 9/2022 | White | H04N 21/4126 |

* cited by examiner

*Primary Examiner* — Shyue Jiunn Hwa

(57) ABSTRACT

A generative content registration system may include a processor. A generative content registration system may include a non-transitory memory coupled to the processor configured to store a generative content registration database comprising generative content registration data. A generative content registration system may include a communication service coupled to a network interface, the communication service configured to receive generative content registration-related service requests. A generative content registration system may include a registry service communicatively coupled to the processor, the registry service comprising a generative content registration service, wherein the processor is configured to: receive a plurality of generative content-related metadata attribute values, write the plurality of generative content-related metadata attribute values to the generative content registration database; and retrieve the plurality of generative content-related metadata attribute values from the generative content registration database.

19 Claims, 33 Drawing Sheets

Let's Face the facts (video)

Content Info

User: John Due
Type: video
Date: 06/06/2023
Time: 5:55 PM
Category: Personal

AI Info

AI Source: AI Video Generator
Owner: RealIllusion
Link: realillusion.com
Third party: None
Functions: Portrait, Face, anime

AIGX Info:

| Field | Value |
|---|---|
| Title | <User AIGX Title> |
| User | <User who generated the content> |
| Ownership | <User or organization> |
| Purpose | <Personal or Commercial> |
| Type | <E.G. text, audio, video> |
| Date | <Generation date> |
| Time | <Generation time> |
| User rating | <User rating> |

AI Info

| Field | Value |
|---|---|
| AI Source | <Name of the AI> |
| Owner | <AI owner> |
| Link | <AI site URL> |
| Third party | <List of secondary AI> |
| Functions | <Tags for AI functions> |
| User rating | <User rating> |

Search by AI name of AIGX ID

FIG. 24

2400 registration

| registration_id | source | parent | status | owner | governance | license |
|---|---|---|---|---|---|---|
| number | source_id | source_id | status_id | owner_id | governance_id | license_id |

FIG. 28A source_systems

| source_id | source_name | source_type | source_version | approval | status | owner | sub_user | rank | rating | source_metadata |
|---|---|---|---|---|---|---|---|---|---|---|
| number | string | string | string | approval_id | status_id | owner_id | sub_user_id | rank_id | rating_id | string |

FIG. 28B files

| file_id | registration_record | filename | file_location | file_type | file_content | file_metadata |
|---|---|---|---|---|---|---|
| number | registration_id | string | string | string | content_cat_id | string |

FIG. 28C content_categories

| content_cat_id | content_cat_name | content_cat_parent_id | content_cat_metadata |
|---|---|---|---|
| number | string | | string |

FIG. 29A governance

| gov_id | region_gov | rule_gov | gov_metadata |
|---|---|---|---|
| | region_id | rule_id | |
| number | | | string |

FIG. 29B content_source

| cs_id | source_id | parent_id |
|---|---|---|
| | | cs_id |
| number | source_id | |

FIG. 29C status

| status_id | status_name | status_metadata |
|---|---|---|
| number | string | string |

FIG. 29D rule

| rule_id | rule_name | rule_metadata |
|---|---|---|
| number | string | string |

| license | | | |
|---|---|---|---|
| license_id | license_name | license_version | license_variation | license_metadata |
| number | string | string | string | string |
| | | | | |
| | | | | |

FIG. 30B

| owner | | |
|---|---|---|
| owner_id | owner_name | owner_metadata |
| number | string | string |
| | | |
| | | |

FIG. 30C

| sub_user | | | | | |
|---|---|---|---|---|---|
| sub_user_id | sub_user_type | sub_user_name | sub_user_parent | sub_user_metadata |
| number | number | string | sub_user_id | string |
| | | | number | |
| | | | | |

FIG. 30D

| provenance | | | |
|---|---|---|---|
| provenance_id | source_id | registration_record | lookup_string |
| number | number | registration_id | string |
| | | number | |
| | | | |

FIG. 30E

| regions | | |
|---|---|---|
| region_id | region_name | region_metadata |
| number | string | string |
| | | |
| | | |

| security | | |
|---|---|---|
| security_id | registration_record | restriction_id | restriction_att |
| number | registration_id | restriction_id | string |

FIG. 31A

| restrictions | |
|---|---|
| restriction_id | restriction_type |
| number | string |

FIG. 31B

| rank | |
|---|---|
| rank_id | rank_score |
| number | string |

FIG. 31C

| source_system_approval | | |
|---|---|---|
| approval_id | approved_content | approved_region |
| number | content_cat_id | region_id |

FIG. 31D

| rating | |
|---|---|
| rating_id | rating_score |
| number | string |

FIG. 31E

GENERATIVE CONTENT REGISTRATION SYSTEM AND METHOD OF USE

CROSS-REFERENCE TO RELATED APPLICATIONS

This application claims priority through the applicant's prior U.S. Provisional Patent Application No. 63/496,700 entitled "CONTENT TRACKING SYSTEM AND METHOD" filed on Apr. 18, 2023, which application is hereby incorporated by reference in its entirety. This application is also a continuation-in-part of U.S. Non-Provisional patent application Ser. No. 18/183,666 entitled "CONTENT TRACKING SYSTEM AND METHOD" filed on Mar. 14, 2023, which application is hereby incorporated by reference in its entirety.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

TECHNICAL FIELD

The present invention relates generally to systems, methods, and computer programs for enhancing one or more of identifying, registering, tracking, source-validating, and managing content, and more particularly, enhancing one or more of identifying, registering tracking, monitoring, authenticating, source-validating, managing, and governing generated output and content, such as, for example, artificial intelligence generated output and content.

BACKGROUND ART

Content, and in particular digital content, such as systems generated output files and data, have often been orphaned from associated data, including source identity data, tracking data, security data, governance data, and other information as they changed form, location, and ownership. Semi-permanent in-file metadata was of limited use based on, for example, one or more of file format dependencies, limited metadata extensibility, and lack of ability to secure metadata from modification. With the continued development of generative systems, and in particular generative artificial intelligence, these problems have been exacerbated. The further evolution and improvement of generative artificial intelligence platforms and technologies will only make distinguishing the source of any generated output increasingly difficult. These outputs have already become an important component travelling across multiple commerce ecosystems, sometimes further evolving into derivatives and transformations of the original output, further obfuscating source identifiability.

Generative artificial intelligence platforms and technologies, in many cases, had as an objective to generate output approaching or surpassing what could otherwise be generated by organic means, such as by human beings. The types of generated output have included, but are not limited to, images, videos, sound, speech, text strings, documents, source code, music, and the like. It has been the case that this output is sometimes indistinguishable or otherwise difficult to distinguish from organically created output. While this objective was purposefully pursued in order to develop technologies that would credibly assist humans in performing certain tasks, an unintended consequence was the production of content that could dupe the consumer of the output into certain beliefs and actions that they might not otherwise have, were they to have known or been made aware of the source of the generated content. Further, the loss of source identity for generated content can make difficult the application of applicable governance regimes, including, for example, the application of regional laws, intellectual property restrictions, licensing restrictions, payment obligations, workflow progressions, and the like.

Historical approaches to tracking, monitoring, authenticating, source-validating, and managing content have typically proven at least partially ineffective. Past initiatives and platforms generally tracked limited information, often relying on embedded and inflexible file structures, such as those found in image file formats and certain vector file formats. Further, these systems typically lacked the mechanics to address multi-layered AI content outputs and data components, and further lacked functionality to support generated content registration, usage, metering, and governance. These approaches were further often limited to a singular focus, such as copyright protection, digital rights management, and maintaining conditions where a particular proprietary file format would secure a dominant market position.

Further, these approaches typically have moved and developed too slowly to keep pace with rapidly advancing technologies. For example, these approaches often attempted to screen content after creation, attempting to identify, for example, how the words in text content may have been generated. This was error prone and was further highly susceptible to manipulation. False positives and a lack of trust across the ecosystem were perpetuated. The advancement of artificial intelligence platforms and technologies have started to face resistance as result, directly impacting their adoption, and therefore realization of their value.

Historically, it has been challenging to persistently associate data relating to a file, its contents, and its state with a given file. Traditional approach typically involved one or more of, using smart file naming schemes, limited fixed metadata elements in the file itself, usurping of fixed metadata elements in the file itself, using extended custom metadata key/value pairs for a small number of files with standards that so support, and associating data to the file in proprietary relational systems requiring the file to remain stored within the proprietary system.

The disadvantages of these approaches were many. Smart file naming relied on the file name remaining unchanged. Further, the file name was limited in length. Also, it required knowledge of the meaning in the symbolic representations represented in the name. All of these, and in particular the need to ensure the name did not change when moving from location to location and owner to owner, made smart file naming impractical, unreliable, and uncertain.

Other approaches involved the use of file metadata typically embedded within the header portion of a fixed-format file. These approaches suffered from numerous limitations and drawbacks. For most file types, standards-compliant metadata key/value pairs were limited in terms of the quantity of the attributes themselves, limitations on the length and type of data values allowed, and whether the values were easily editable or editable at all.

A very small number of file types attempted to comply with standards that supported extending the metadata key/ value pairs to include newly-added custom pairs. This was only available for certain file types, meaning that the approach was not extensible across a broad array of present and future file types. Further, whether or not editing or viewing applications tolerated the extension was dependent on such application choosing to comply with the particular standard that extended the metadata capabilities. Finally, although these additional key/value might be made available within the file, there was no way to lock the values and keep them from being modified, nor was there a way to maintain a historical record of changes to the keys, values, or both.

Another approach to extending the capabilities of using file metadata was to usurp certain standard key/values for other purposes. For example, the location value of a file could be usurped for other uses. This led to a variety of problems, including the fact that other applications have no knowledge of this usurped usage, and therefore would and could overwrite the values for their own purposes. Further, this usurping relies on the standard not being modified in a way that would break the adulterated usage.

With all of this, it still might have been possible to make use of these metadata fields so long as the files were tightly controlled within one or more proprietary systems. But this limitation made it difficult, if possible at all, to persistently maintain file-to-data association once the file was shared, distributed, or published. It is the situation of the file entering the wild where the need for associated data persistence is lacking. This could include, for example, the need to know where a file has been, what is its origin, the classification of the data contained therein, relevant keyword or tags, a description, license information, copyright information, workflow trigger values, to name just a few.

And in fact, it is this proprietary approach that has made up most of the present-day systems, including document management systems, file storage systems, image repositories, and the like. These systems typically allowed some level of file-to-data information to be stored in the proprietary system, and recently has incorporated tagging technologies. On the face of it, it seems useful, but as soon as a file leaves the system, it typically became orphaned. It is not unlike a chain of custody problem, as even if the file came back to the system, there was generally little if any verification to perform an intelligent correlation assessment. Further, so long as the file was outside the system, that file-to-data information in the proprietary system was unavailable.

SUMMARY OF THE INVENTION

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of this disclosure.

The content tracking system and method disclosed herein can facilitate the persistent storage, retrieval, and maintaining of associated data of interest across the content lifecycle, such as across transmission, transfer, transformation, modification, and derivative generation, allowing for persistent linkage between content and associated data. This, in turn, can provide one or more advantages to prior approaches, including the tracking, monitoring, authenticating, source-validating, managing, and governing of generated output and content, such as, for example, artificial intelligence generated output.

In some instances, the content tracking system and method includes one or more of,
a) a generated content management platform including one or more of
   a. Generated content packaging service including one or more of a content container generation engine, encoding engine, and hashing engine;
   b. a content container recovery service;
   c. a content container tracking service;
   d. a content container monitoring service;
   e. a content container check-in service;
   f. a content container locking service;
   g. a content container destruction service;
   h. a generated content governance service;
   i. a content container management service;
   j. a content container verification service;
   k. analytics services;
   l. reporting services
   m. source specific services;
   n. communication services;
   o. messaging services;
   p. encryption services;
   q. file services;
   r. rules services;
b) a content container such as, for example,
   a. an embedded content file including one or more of,
      i. embedded content;
      ii. embedded metadata, such as, for example, side car data;
      iii. embedded execution code;
      iv. an embedded persistent log;
   b. a file package including one or more of,
      i. content file or files;
      ii. metadata file or files, such as, for example side care file or files;
      iii. executable code;
     iv. a log file;
   c. a side car file including one or more of,
      i. metadata;
      ii. executable code;
      iii. log data;
   d. reference to a content data record, such as a data record including side car file data;
c) a generative content registration database including persistent storage of one or more of,
   a. System_ID;
   b. File_ID;
   c. Source_ID;
   d. Security_att;
   e. Registered_Owner;
   f. Sub_User_ID;
   g. Access_Method;
   h. Type;
   i. Classification;
   j. Region_att;
   k. Governance_att;
   l. Content_Category;
   m. Commerce_Flag;
   n. Linked_Platform;
   o. Third_Parties;
   p. Privacy_Flag;
   q. Rating;
   r. Restrictions;
   s. Status;
   t. Rank;

d) Side car file data attributes including, for example, one or more of,
   a. System_ID;
   b. File_ID;
   c. Source_ID;
   d. Security_att;
   e. Registered_Owner;
   f. Sub_User_ID;
   g. Access_Method;
   h. Type;
   i. Classification;
   j. Region_att;
   k. Governance_att;
   l. Content_Category;
   m. Commerce_Flag;
   n. Linked_Platform_att;
   o. Third_Party_att;
   p. Privacy_Flag;
   q. Rating_att;
   r. Restrictions_att;
   s. Status;
   t. Rank_att;
e) a content container repository including,
   a. a file store;
   b. a file identification database configured to store structured or unstructured data;
f) a content container generation service including one or more of,
   a. a content container generate API;
   b. a content container recover API;
   c. a content container update API;
   d. a get API;
   e. a set API;
   f. a content container lock API;
   g. a content container release API;
   h. a content container verify API;
   i. a log API;
   j. an alert API;
g) a content registration service including one or more of,
   a. a get source providers list API;
   b. an insert source provider API;
   c. a modify source provider API;
   d. a delete source provider API;
   e. a get registered owners list API;
   f. an insert registered owner API;
   g. a modify registered owner API;
   h. a delete registered owner API;
   i. a get region API;
   j. an insert region API;
   k. a modify region API;
   l. a delete region API;
   m. a get governance attribute API;
   n. an insert governance attribute API;
   o. a modify governance attribute API;
   p. a delete governance attribute API;
   q. a get content category API;
   r. an insert content category API;
   s. a modify content category API;
   t. a delete content category API;
   u. a get content status API;
   v. an insert content status API;
   w. a modify content status API;
   x. a delete content status API;
   y. a get source status API;
   z. an insert source status API;
   aa. a modify source status API;
   bb. a delete source status API;
   cc. a get linked service API;
   dd. an insert linked service API;
   ee. a modify linked service API;
   ff. a delete linked service API;
   gg. a get rating API;
   hh. an insert rating API;
   ii. a modify rating API;
   jj. a delete rating API;
   kk. a get restriction API;
   ll. an insert restriction API;
   mm. a modify restriction API;
   nn. a delete restriction API;
   oo. an execute rule API;
   pp. an add execution rule API;
   qq. a delet execution rule API;
   rr. a get notifications API;
h) analytics and report services, including generation services and retrieval services;
i) a content container support app including one or more of
   a. a generated content management service interface;
   b. a content container check-in service interface;
   c. a content container destruction service interface;
   d. a content container locking service interface;
   e. a content container verification service interface;
   f. a content container compliant application interface;
   g. a content container destruction interface;
   h. a content container locking interface;
   i. a content container logging interface; and
   j. a generated content export.

In some embodiments, one or more content generative technologies communicate and interface with one or more components of the content tracking system, such as the aforementioned services and interfaces. In some embodiments, a content container compliant application communicates and interfaces with one or more content container compliant applications. In some embodiments, the services of the content tracking system are maintained and available through content state changes, such as changes to form, location, and ownership.

In some embodiments, the content tracking system and method facilitates the secure tracking, management, and ongoing governance of content containers and associated content, such as generated content and output, beginning at or near the time of creation. In some instances, the content tracking system and method facilitates the secure tracking, management, and ongoing governance of content containers and associated content, such as generated content and output, beginning after the time of creation.

In some instances, one or more of the executable portion of the content container, the content container support app, the content container compliant application, and the content generative technology, alone or in combination, participates in the enforcement of one or more content security, management, or governance behaviors.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the present systems and methods and their practical applications, to thereby enable others skilled in the art to best utilize the present systems and methods and various embodiments with various modifications as may be suited to the particular use contemplated.

In some instances, the inclusion of persistent and maintained security attributes, governance attributes, or both in one or more of content containers, content container packages, side car files, or a registration database can improve one or more of the flexibility, persistence, and reliability of content and content container security and security enforcement.

In some instances, the presence of a content container support app can reduce or eliminate native application content container support code, consequently reducing the memory footprint of native applications, and the maintenance burden associated with the native application content container support code.

In some instances, the distribution of one or more of security, management, and governance enforcement across native applications, a content container support app, and content container services and registry services, can improve one or more of security, management, and governance reliability, bandwidth efficiency, communicative ease, and user efficiency.

In some instances, reduced dependence on native file metadata use and the introduction registration services and content management services improved extensibility and robustness of the associated content data set, reduced or eliminated problems associated with overwriting and deletion of attributes and attribute values, allowed for controlled and enhanced access and viewing of content associated attribute values, allowed for the locking of attribute values, and improved the ability to maintain a historical record of changes to the attribute keys and values. In addition, usurping of standard attribute keys and values can be reduced or eliminated, allowing for improved data integrity and more robust reliance by native applications and content tracking system services and apps alike.

In some aspects, the techniques described herein relate to a generative content registration system, including: a processor; a non-transitory memory coupled to the processor configured to store a generative content registration database including generative content registration data; a communication service coupled to a network interface, the communication service configured to receive generative content registration-related service requests; and a registry service communicatively coupled to the processor, the registry service including a generative content registration service, wherein the processor is configured to: receive a plurality of generative content-related metadata attribute values; write the plurality of generative content-related metadata attribute values to the generative content registration database; and retrieve the plurality of generative content-related metadata attribute values from the generative content registration database.

In some aspects, the techniques described herein relate to a generative content registration system, wherein the generative content registration data includes an association with artificial intelligence generated content.

In some aspects, the techniques described herein relate to a generative content registration system, wherein the plurality of generative content-related metadata attribute values includes at least one of: (a) a generative content source provider; (b) a generative content registered owner; (c) a region; (d) a governance attribute; (e) a generative content category; (f) a generative content status; (g) a generative content source status; (h) a linked service; (i) a rating; (j) a rank; (k) a file identifier; (l) a content category; (m) an owner; (n) a sub user; (o) a restriction; (p) a license attribute; or (q) rule.

In some aspects, the techniques described herein relate to a generative content registration system, wherein the license attribute includes one or more of: (a) a license name; (b) a license version; (c) a license variation; or (d) a license metadata value.

In some aspects, the techniques described herein relate to a generative content registration system, including an owner registration record including one or more of an owner or a source system owner.

In some aspects, the techniques described herein relate to a generative content registration system, wherein the sub user includes a source system end user identifier.

In some aspects, the techniques described herein relate to a generative content registration system, wherein the sub user includes an API end consumer identifier.

In some aspects, the techniques described herein relate to a generative content registration system, wherein the sub user includes a third-party API interface identifier.

In some aspects, the techniques described herein relate to a generative content registration system, including: a processor; a non-transitory memory coupled to the processor configured to store a generative content registration database including generative content registration data; a communication service coupled to a network interface, the communication service configured to transmit generative content registration-related service request responses; and a registry services layer including a plurality of registry services communicatively coupled to the processor including: a registry administration service; and a content verification service.

In some aspects, the techniques described herein relate to a generative content registration system, wherein the plurality of registry services includes a generated content governance service.

In some aspects, the techniques described herein relate to a generative content registration system, wherein the generated content governance service includes a governing operation based, at least in part, on one or more of: (a) an associated geographic region; (b) an associated political region; or (c) applicable laws.

In some aspects, the techniques described herein relate to a generative content registration system, wherein the content verification service includes one or more of: (a) content verification; (b) content container verification; or (c) content container package verification.

In some aspects, the techniques described herein relate to a generative content registration system, wherein the content verification service includes transmitting a verification message indicative of a verification result status.

In some aspects, the techniques described herein relate to a generative content registration system, wherein the verification result status includes verifying a first generative content-related metadata attribute value is equal to a second generative content-related metadata attribute value.

In some aspects, the techniques described herein relate to a generative content registration system, wherein the second generative content-related metadata attribute value is a registration database generative content-related metadata attribute value.

In some aspects, the techniques described herein relate to a generative content registration system, wherein the first generative content-related metadata attribute value is an embedded generative content-related metadata attribute value.

In some aspects, the techniques described herein relate to a generative content registration system, wherein the first generative content-related metadata attribute value is a non-embedded generative content-related metadata attribute value.

In some aspects, the techniques described herein relate to a generative content registration system, wherein the first generative content-related metadata attribute value is a side car file generative content-related metadata attribute value.

In some aspects, the techniques described herein relate to a generative content registration system, wherein the first generative content-related metadata attribute value is a file package generative content-related metadata attribute value.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 15 is a screenshot of a generative content registration database video content search results view of the content tracking system of FIG. 1;

FIG. 24 is a screenshot of a content container viewing app interface;

FIG. 28A through FIG. 28C are a series of diagrams of various tables of the content tracking system supporting various registry service functions;

FIG. 29A through FIG. 29E are a series of diagrams of various tables of the content tracking system supporting various registry service functions;

FIG. 30A through FIG. 30E are a series of diagrams of various tables of the content tracking system supporting various registry service functions; and FIG. 31A through FIG. 31E are a series of diagrams of various tables of the content tracking system supporting various registry service functions.

DETAILED DESCRIPTION

Figure 1:
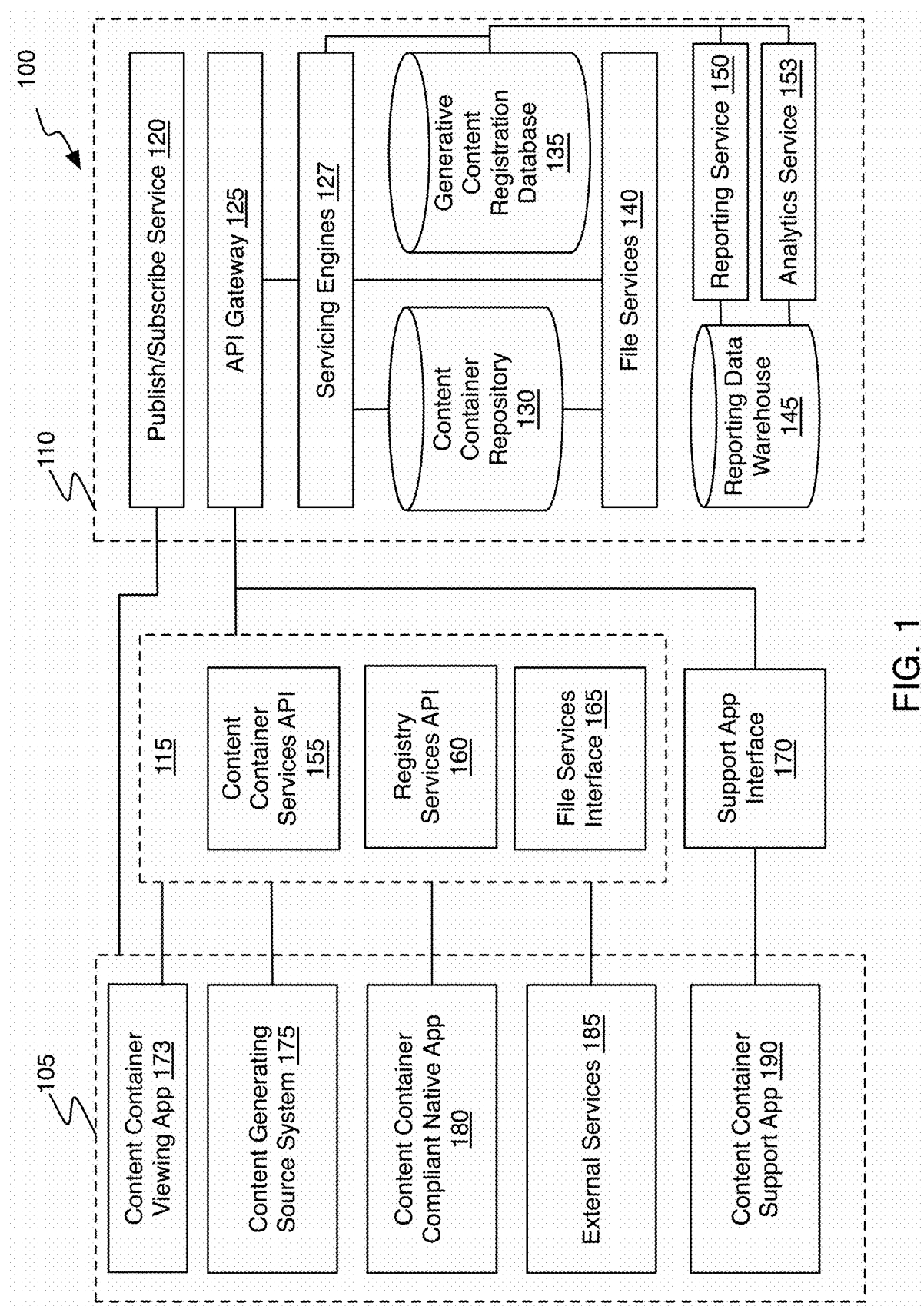
FIG. 1 is a block diagram of the services and component layers of the content tracking system deployable on the architecture of FIG. 2.

Many different systems can implement the methods of the content tracking system. Moreover, the steps of the present method could occur at different parts of a system, at a single part of a system, in parallel across the system, or in any other fashion. Moreover, certain embodiments of the content tracking system are described with reference to methods, apparatus (systems) and computer program products that can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction that implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. The various illustrative logical blocks, modules, and circuits described in connection with the embodiments disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a solid state drive, a hard disk drive, a removable disk, a CD-ROM, or any other form of computer-readable storage medium known in the art. An exemplary storage medium is coupled to one or more processors such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of this disclosure.

In some instances, the content tracking system and method includes one or more of, j) a generated content management platform 300 including one or more of
  a. Generated content packaging service 430 including one or more of a content container generation engine, encoding engine, and hashing engine operable to generate content containers, including one or more of content, such as generated content, side car file data, such as a side care file, instructions, such as executable code, and log information;
  b. a content container recovery service 455 operable to recover damaged or lost content containers and content container packages;
  c. a content container tracking service 435 operable to track and log one or more of content, content containers, or content packages, including tracking of one or more of access, modification, location, duplication, and the like;
  d. a content container monitoring service 460 operable to detect and publish one or more of content, content container, and content package events, such as access, modification, location, and duplication events;
  e. a content container check-in service 440 operable to allow for active reporting of content, content container, and content package events, such as access, modification, location, and duplication events;
  f. a content container locking service 465 operable to lock or restrict access or editing of one or more of content, content containers, and content packages;
  g. a content container destruction service 445 operable to soft delete, hard delete, or destroy one or more of content, content containers, and content packages;
  h. a generated content governance service 485 operable to provide one or more governing functions, such as governing operations predicated, at least in part on geographic or political regions, applicable laws, or the like;
  i. a content container management service 490 operable to provide one or more of content, content container, or content container package management functions;
  j. a content container verification service 480 operable to perform one or more of content, content container, or content container package verification, and to generate corresponding messages and outputs indicative of the verification result status;
  k. analytics service 153 operable to generate, store, and transmit analytic output for content, content containers, and content packages;
  l. reporting service 150 operable to generate, store, and transmit analytic output for content, content containers, and content packages;
  m. source specific services 470 operable to perform actions based, at least in part on, content source information, such as, for example, a Source_ID attribute value;
  n. communication services 410 operable to facilitate communication between content tracking system platform services and content support applications, third party applications and services, native applications, and the like;

o. messaging services 405, such as, for example, a publish/subscribe service, 120 operable to facilitate one or more of broadcasting or transmitting messages and notifications;
p. encryption services 415 operable to support the encryption of one or more of content, content containers, content container contents, content container packages, content container packages content, file repository content, and registration database content;
q. file services 140 operable to receive, transform, store, log, and transmit files, such as to and from the content container repository 130;
r. rules services 140 operable to create, update, delete, maintain, and execute rules;

k) a content container such as, for example,
  a. an embedded content file including one or more of,
    i. embedded content;
    ii. embedded metadata, such as, for example, side car data;
    iii. embedded execution code;
    iv. an embedded persistent log;
  b. a file package including one or more of,
    i. content file or files;
    ii. metadata file or files, such as, for example side care file or files;
    iii. executable code;
    iv. a log file;
  c. a side car file including one or more of,
    i. metadata;
    ii. executable code;
    iii. log data;
  d. reference to a content data record, such as a data record including side car file data;

l) a generative content registration database 135 including persistent storage of one or more of attributes including,
  a. System_ID;
  b. File_ID;
  c. Source_ID;
  d. Security_att;
  e. Registered_Owner;
  f. Sub_User_ID;
  g. Access_Method;
  h. Type;
  i. Classification;
  j. Region_att;
  k. Governance_att;
  l. Content_Category;
  m. Commerce_Flag;
  n. Linked_Platform;
  o. Third_Parties;
  p. Privacy_Flag;
  q. Rating;
  r. Restrictions;
  s. Status;
  t. Rank;

m) Side car file data attributes including, for example, one or more of,
  a. System_ID;
  b. File_ID;
  c. Source_ID;
  d. Security_att;
  e. Registered_Owner;
  f. Sub_User_ID;
  g. Access_Method;
  h. Type;
  i. Classification;
  j. Region_att;
  k. Governance_att;
  l. Content_Category;
  m. Commerce_Flag;
  n. Linked_Platform_att;
  o. Third_Party_att;
  p. Privacy_Flag;
  q. Rating_att;
  r. Restrictions_att;
  s. Status;
  t. Rank_att;

n) a content container repository 130 including,
  a. a file store;
  b. a file identification database configured to store structured or unstructured data;

o) a content container generation service including one or more of,
  a. a content container generate API;
  b. a content container recover API;
  c. a content container update API;
  d. a get API;
  e. a set API;
  f. a content container lock API;
  g. a content container release API;
  h. a content container verify API;
  i. a log API;
  j. an alert API;

p) a content registration service including one or more of,
  a. a get source providers list API;
  b. an insert source provider API;
  c. a modify source provider API;
  d. a delete source provider API;
  e. a get registered owners list API;
  f. an insert registered owner API;
  g. a modify registered owner API;
  h. a delete registered owner API;
  i. a get region API;
  j. an insert region API;
  k. a modify region API;
  l. a delete region API;
  m. a get governance attribute API;
  n. an insert governance attribute API;
  o. a modify governance attribute API;
  p. a delete governance attribute API;
  q. a get content category API;
  r. an insert content category API;
  s. a modify content category API;
  t. a delete content category API;
  u. a get content status API;
  v. an insert content status API;
  w. a modify content status API;
  x. a delete content status API;
  y. a get source status API;
  z. an insert source status API;
  aa. a modify source status API;
  bb. a delete source status API;
  cc. a get linked service API;
  dd. an insert linked service API;
  ee. a modify linked service API;
  ff. a delete linked service API;
  gg. a get rating API;
  hh. an insert rating API;
  ii. a modify rating API;
  jj. a delete rating API;
  kk. a get restriction API;
  ll. an insert restriction API;
  mm. a modify restriction API;

nn. a delete restriction API;
oo. an execute rule API;
pp. an add execution rule API;
qq. a delete execution rule API;
rr. a get notifications API;
q) analytics and report services 150, 153, including generation services, storage services, and retrieval services;
r) a content container support app 190 including one or more of
  a. a generated content management service interface;
  b. a content container check-in service interface;
  c. a content container destruction service interface;
  d. a content container locking service interface;
  e. a content container verification service interface;
  f. a content container compliant application interface;
  g. a content container destruction interface;
  h. a content container locking interface;
  i. a content container logging interface; and
  j. a generated content export.

Referring now to FIG. 1, in some implementations, the content tracking system 100 includes a backend platform 110, including one or more of services engines 127, an API gateway 125, a reporting data warehouse 145, and file services 140, an interface layer 115 servicing one or more external applications or services 105, 185. The external applications and services can include, for example, a content container viewing app 173, content generating source systems 175, such as generative artificial intelligence systems, content container compliant native applications 180, such as applications that can one or more of recognize one or more of side car files, content containers, or content container packages, read side car file data, perform actions and behaviors based on one or more side care data file attribute values, extract content, and communicate with the content tracking system platform. In some embodiments, a content container support app 190 can perform one or more actions on behalf of or for the benefit of one or more external applications, such as non-compliant native applications.

In some embodiments, the interface layer 115 can include a plurality of interfaces to one or more content tracking system platform services, such as, for example, a content container services API 155, a registry service API 160, and a file services interface 165. A proprietary support app interface 170 can be provided to facilitate the providing of content tracking system services to the content container support app 190.

Figure 2:
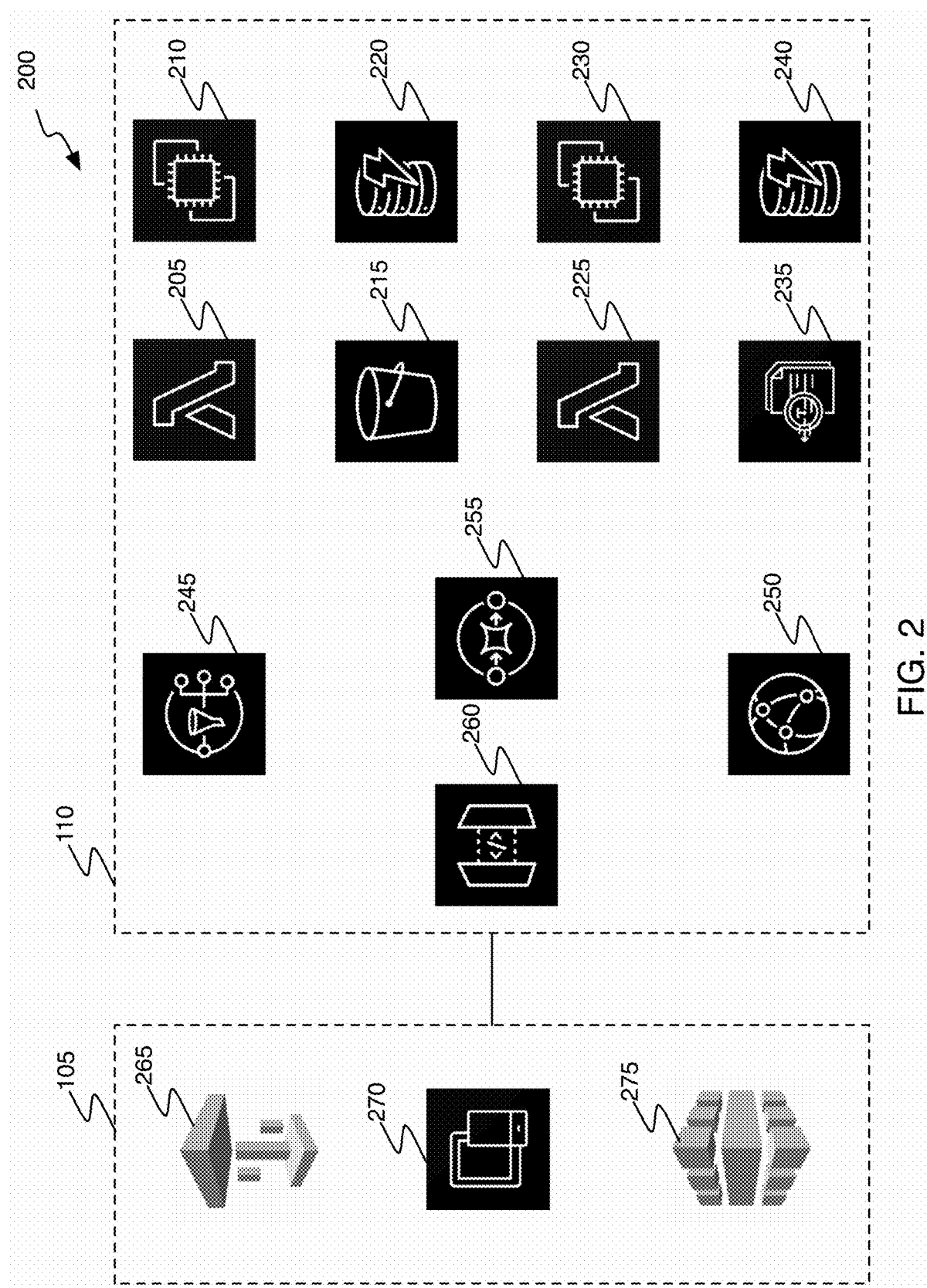
FIG. 2 is a block diagram of an architecture supporting the content tracking system, including a cloud-based, back-end infrastructure.

Referring now also to FIG. 2, in some embodiments, the content tracking system can be, at least in part, implemented on a cloud infrastructure 200, such as Amazon Web Services, Microsoft Azure, Google Cloud, and the like, where such cloud infrastructure services run on and are made available form one or more computing devices, including one or more servers. In some embodiments, such as those using one or more of the infrastructure components available with Amazon Web Services, the contract content tracking system includes one or more messaging systems, such as a publish/subscribe system 120, such as the Amazon AWS SNS service 245. The platform can also include an API gateway, such as the Amazon AWS API Gateway 260 providing interfaces to one or more of external applications and services 270 and content generation systems 265, in communication with one or more backend services interfaces 255 in communication with serverless operations, such as lambda compute functions 205, 225, file repositories and data repositories, such as Amazon S3, 215 and Amazon RDS 220. In some instance, on-instances processes support one or more services, such as processes running on Amazon EC2 instances 210, 230. One or more data warehouses or data lakes can support one or more reporting services or analytic services, such as Amazon Redshift 240 supporting Amazon Quicksight 235. In some instances, a proprietary interface layer 250 supports content container support apps 275, which can further utilize the API gateway.

Figure 3:
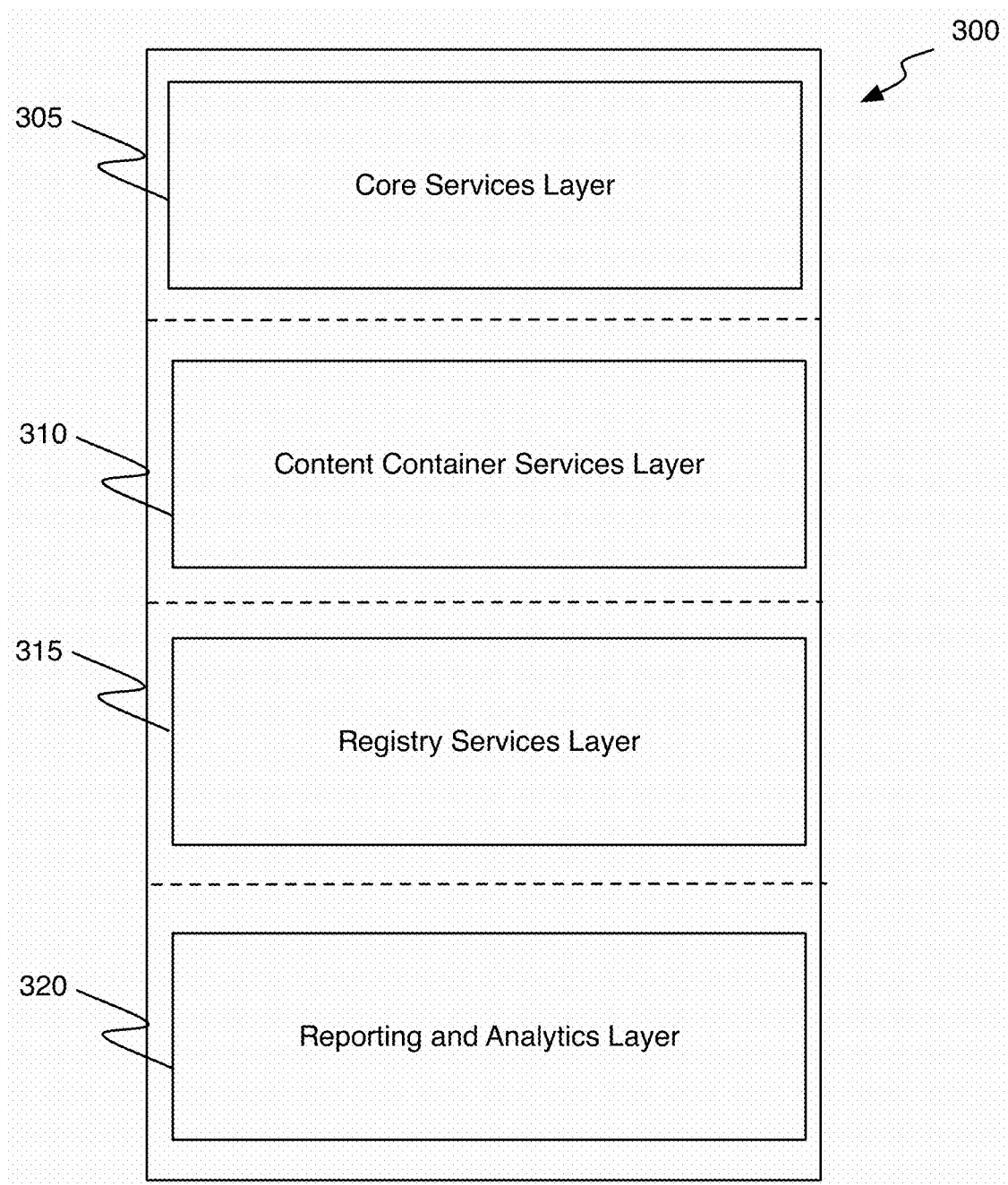
FIG. 3 is a block diagram of the services layers of the content tracking system of FIG. 1.
Figure 4:
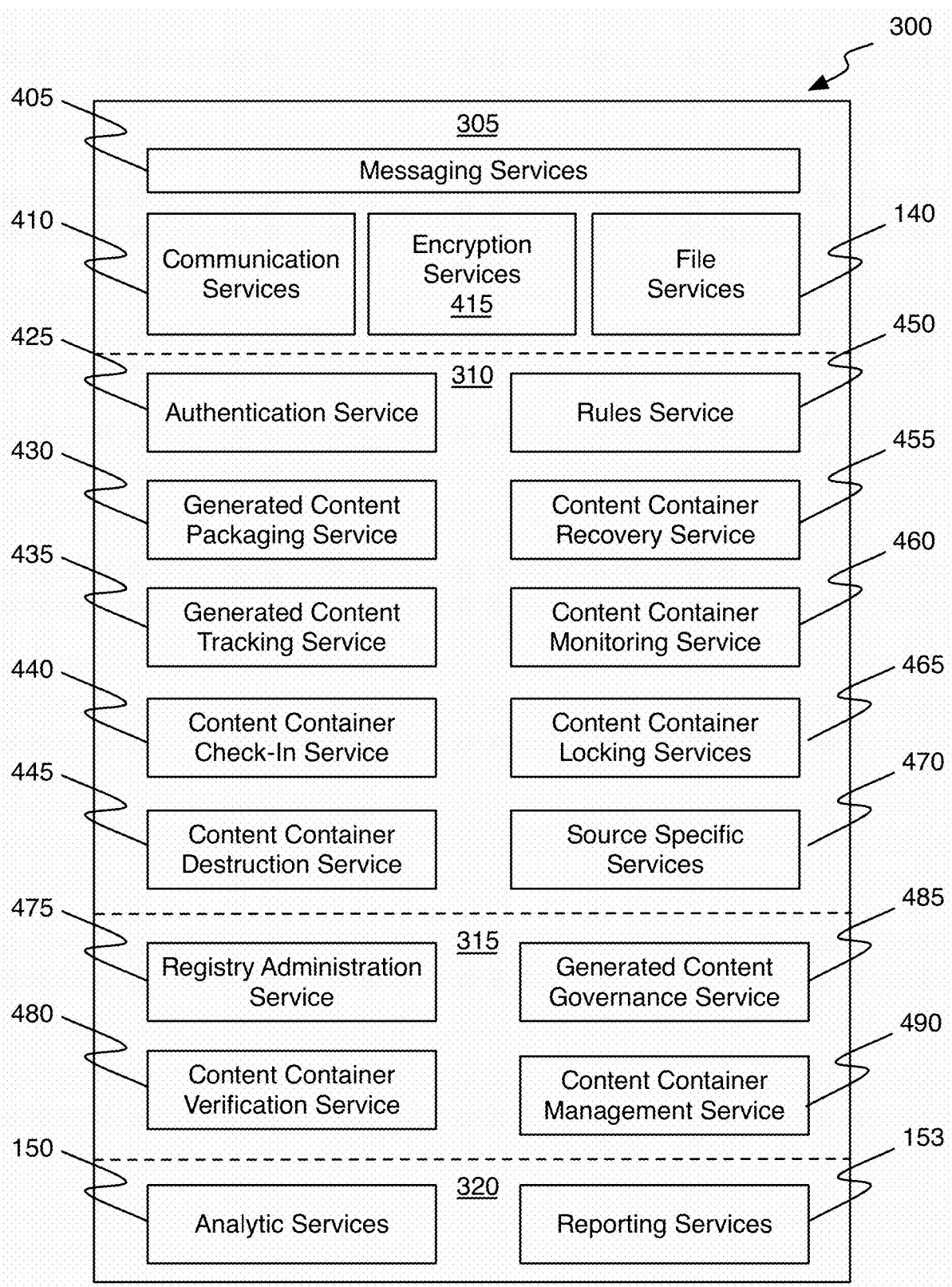
FIG. 4 is a block diagram of the various services, engines, and components of the services layers of FIG. 3 performing the various operations of the content tracking system of FIG. 1.

Referring now to FIG. 3 and FIG. 4, in some implementations, the content tracking system includes a plurality of backend service layers, such as a core services layer 305, a content container services layer 310, a registry services layer 315, and reporting and analytics services layer 320. The core services layer 305 can include core services, such as, messaging services 405, communication services 410, encryption services 415, and file services 140. The content container services layer 310 can include one or more of an authentication service 425 for authenticating system access 425, a rules service 450, a generated content packaging service 430, a content container recovery service 455, a content container check-in service 440, a content container locking service 465, a content container destruction service 445, and source specific services 470. Analytic and reporting services 150, 153 can be provided with the reporting and analytics layer 320.

In some implementations, the registry services layer includes a generative content registration database 135 supporting one or more registry services such as registry administration services 475, generated content governance services 485 for providing services relating to applicable content restrictions, content container verification services 480, and content container management services 490.

a. Referring now to FIG. 28A, in some instances, a registration table includes attributes such as:

| registration_id | Unique ID |
|---|---|
| source | source_id from the source table |
| parent_source | source_id from the source table |
| status | status_id from the status table |
| owner | owner_id from the owner table |
| governance | governance_id from the governance table |
| license | license_id from the license table |
| registration_metadata | Registration associated metadata |

The registration table can store the primary registration record for content, including, for example, numerous foreign key fields applicable to the generated content.

Referring now to FIG. 28B, in some instances, a source_systems table includes attributes such as:

| source_id | Unique ID |
|---|---|
| source_name | Name of content generation source system (e.g., ChatGPT, Dali, etc.) |
| source_type | Type of content generation source system |
| source_version | Content generation source system version |
| approval | approval_id |
| status | status_id |
| owner | owner_id |
| sub_user | sub_user_id |
| rank | rank_id |
| rating | rating_id |
| source_metadata | Source associated metadata |

The source_system table can store the primary record for information relating to the source content systems, including, for example, numerous foreign key fields applicable to source systems.

Referring now to FIG. 28C, in some instances, a files table includes attributes such as:

| file_id | Unique ID |
|---|---|
| registration_record | registration_id |
| filename | File name |
| file_location | File location |
| file_type | File type |
| file_content | content_cat_id |
| file_metadata | File associated metadata |

The file table can store the information about content storage, including, for example, the file name, file location in the content container repository 130, the file type, the content type of the file content, and the like.

Referring now to FIG. 29A, in some instances, a content_categories table includes attributes such as:

| content_cat_id | Unique ID |
|---|---|
| content_cat_name | Content category name |
| conent_cat_parent_id | content_cat_id |
| content_cat_metadata | Content category associated metadata |

The content_categories table can store information about, for example, they types of content.

Referring now to FIG. 29B, in some instances, a governance table includes attributes such as:

| gov_id | Unique ID |
|---|---|
| region_gov | region_id |
| rule_gov | rule_id |
| gov_metadata | Governance associated metadata |

The governance table can store information about, for example, applicable governing rule sets for content.

Referring now to FIG. 29C, in some instances, a content_source table includes attributes such as:

| cs_id | Unique ID |
|---|---|
| source_id | source_id |
| parent_id | source_id |

The content_source table can store information about the source system or systems that provided or generated content.

Referring now to FIG. 29D, in some instances, a status table includes attributes such as:

| status_id | Unique ID |
|---|---|
| status_name | Status name |
| status_metadata | Status associated metadata |

The status table can store information about, for example, content and source systems, including, for example, active, suspended, limited use, penalty, and the like.

Referring now to FIG. 29E, in some instances, a rule table includes attributes such as:

| rule_id | Unique ID |
|---|---|
| rule_name | Governing rule name |
| rule_metadata | Rule associated metadata |

The rule table can store information about governance rules, regulations, and the like.

Referring now to FIG. 30A, in some instances, a license table includes attributes such as:

| license_id | Unique ID |
|---|---|
| license_name | License name |
| license_version | License version |
| license_variation | License variatoin |
| license_metadata | License associated metadata |

The license table can store information about license applicable to registration records, content, and the like.

Referring now to FIG. 30B, in some instances, an owner table includes attributes such as:

| owner_id | Unique ID |
|---|---|
| owner_name | Owner name |
| owner_metadata | Owner associated metadata |

The owner table can store the information about owners, such as, for example, registration record owners, source system owners, and the like.

Referring now to FIG. 30C, in some instances, a sub-user table includes attributes such as:

| sub_user_id | Unique ID |
|---|---|
| sub_user_type | Sub-user type |
| sub_user_name | sub-user name |
| parent | sub_user_id |
| sub_user_metadata | Sub-user associated metadata |

The sub_user table can store the information about the person, entity, or technology accessing the source system, registry database, or the like, such as, for example, source system end users, source system api end consumers, third party api interfacing systems, sub_users of sub_users, and the like.

Referring now to FIG. 30D, in some instances, a provenance table includes attributes such as:

| provenance_id | Unique ID |
|---|---|
| source | source_id |
| registration_record | registration_id |
| lookup_string | Connection string for external provenance system |

The provenance table can store the information about accessing systems that store the current and historical ownership of the content, such as provenance tracking blockchain systems.

Referring now to FIG. 30E, in some instances, a regions table includes attributes such as:

| region_id | Unique ID |
|---|---|
| region_name | Name of region |
| region_metadata | Region associated metadata |

The regions table can store attributes representing and information about geographical, political, professional, industrial, academic, and other segments or regions associated with other data elements.

Referring now to FIG. 31A, in some instances, a security table includes attributes such as:

| | |
|---|---|
| security_id | Unique ID |
| registration_record | registration_id |
| restriction_id | restriction_id |
| restriction_att | restriction.number |

The security table can store the information about security and use restrictions and limitations for content associated with registration records.

Referring now to FIG. 31B, in some instances, a restrictions table includes attributes such as:

| | |
|---|---|
| restriction_id | Unique ID |
| number | Numerical value associated with a restriction type attribute |

The restrictions table can store the information about security and use restrictions and limitations attributes for content associated with registration records. Numerical values can correspond to, for example,
  a) Regional governance attribute;
  b) Sector attribute (e.g., public, private, etc.);
  c) Discoverable attribute;
  d) Role attribute;
  e) Access attribute (e.g., count limitation, etc.);
  f) Transfer attribute (e.g., count limitation, requirement limitation, etc.);
  g) Expiration attribute (e.g., time based access, license, and the like, restriction on the generated content);
  h) Approved users attribute;
  i) Password related attributes;
  j) Copyright registration related attribute (e.g., status, registration number, licensing entity, and the like); and
  k) Allowed registry access methods attribute (e.g., direct, secondary interface, api, etc.).

Referring now to FIG. 31C, in some instances, a rank table includes attributes such as:

| | |
|---|---|
| rank_id | Unique ID |
| number | Numerical value associated with a rank level attribute |

The rank table can store the information about a source system ranking relative to its peer systems.

Referring now to FIG. 31D, in some instances, a source_system_approval table includes attributes such as:

| | |
|---|---|
| approval_id | Unique ID |
| approved_content | content_cat_id |
| approved_region | region_id |

The source_system_approval table can store the information about the type of content with which and the regions in which the source system can operate.

Referring now to FIG. 31E, in some instances, a rating table includes attributes such as:

| | |
|---|---|
| rating_id | Unique ID |
| number | Numerical value associated with a rating level attribute |

The rating table can store the information about content source ratings, such as, for example, a credibility score.

Figure 5A:
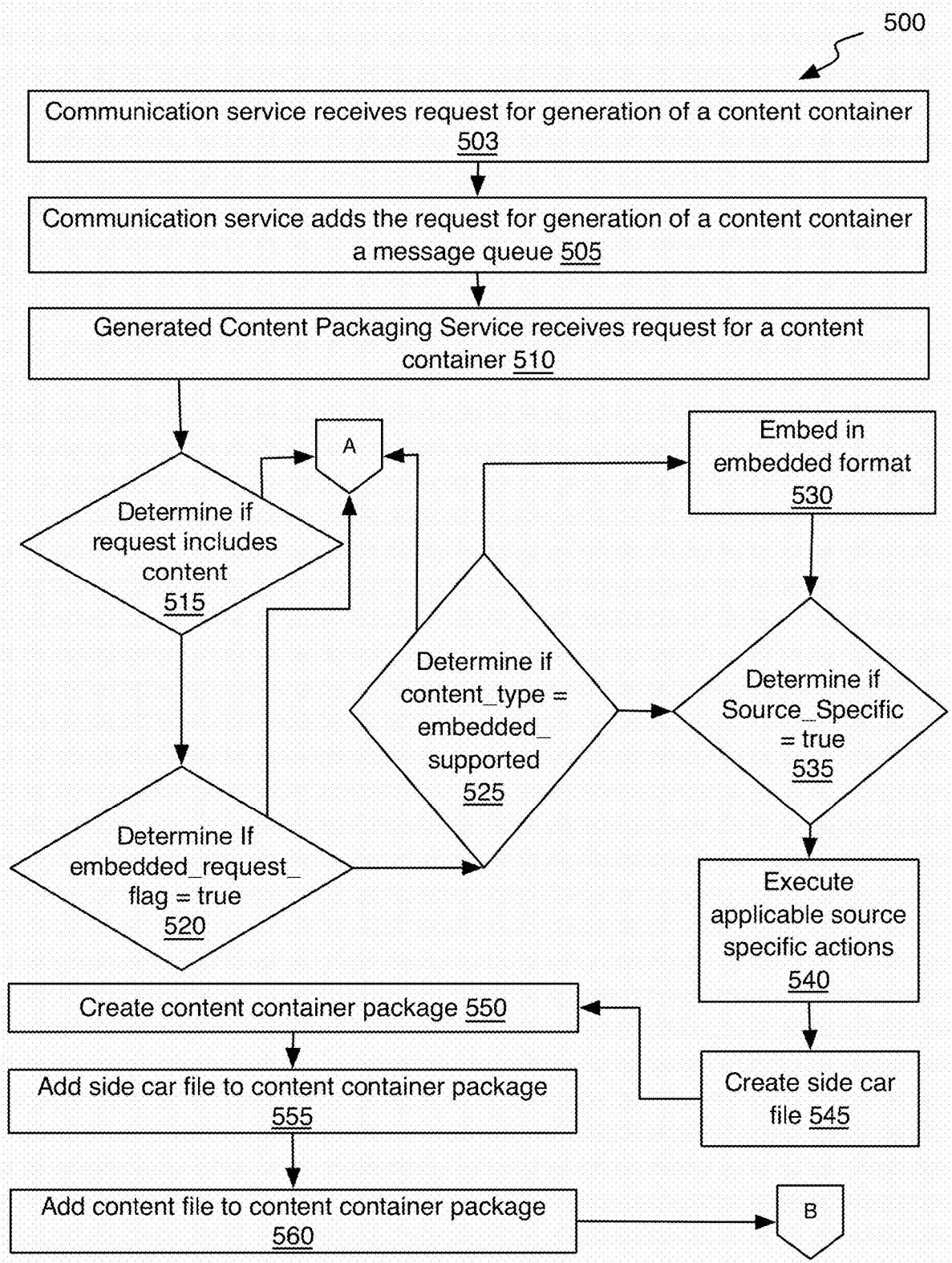
FIG. 5A and FIG. 5B are flowcharts of the content container generation processing operations and activities performed by the Generated Content Packaging Service and other services of FIG. 4 in the content tracking system of FIG. 1.
Figure 5B:
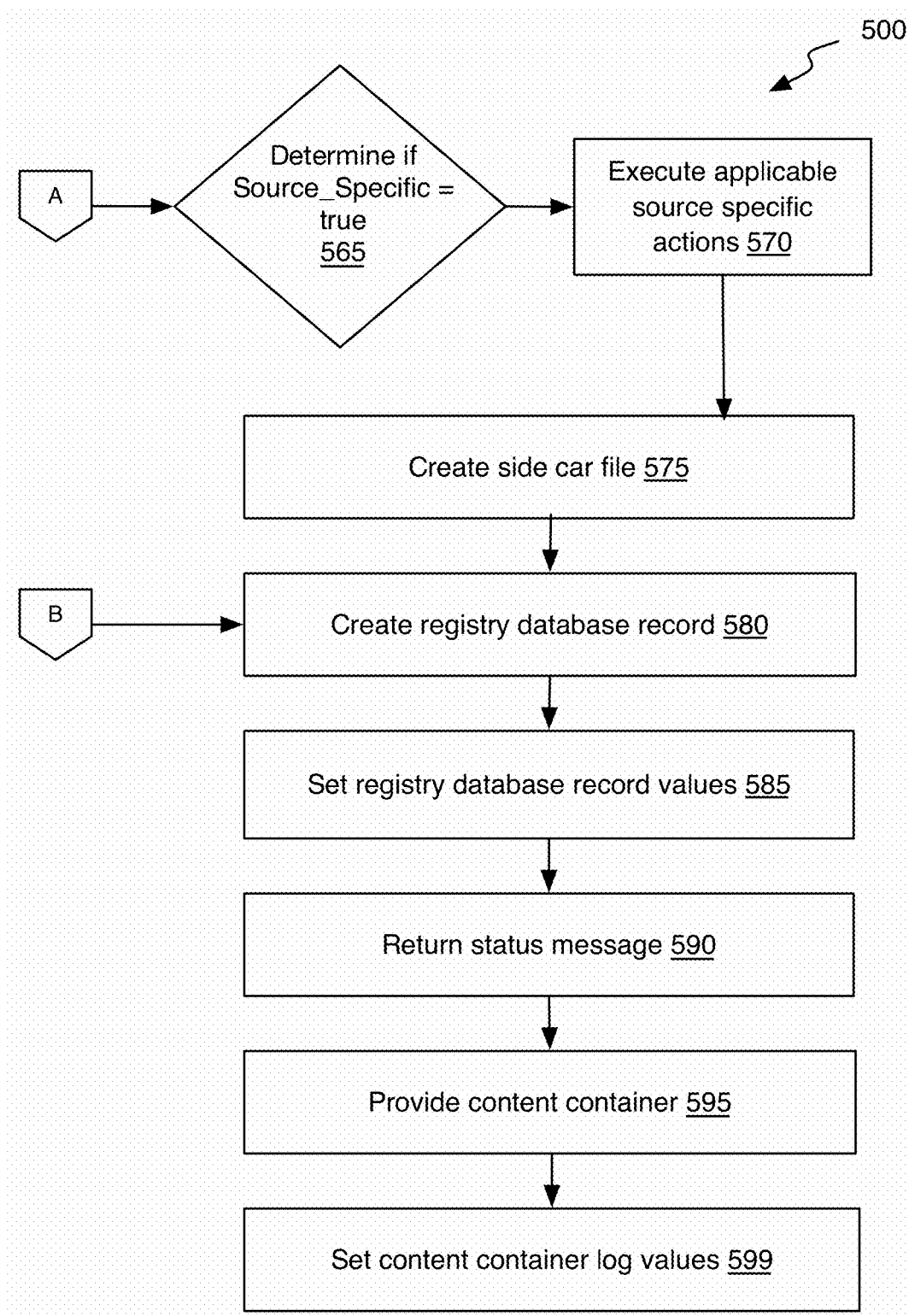

Referring now to FIG. 5A and FIG. 5B, in some embodiments, the content tracking system provides for content container generation 500. The communication service 410 receives a content container generation request 503, such as from a content generating source system 175, a content container compliant native application 180, an external service 185, or the content container support app 190. The communication service 410 then places the request in a message queue 505, which then delivers the message to the relevant service or services. The generated content packaging service 430 receives the request 510 and initiates the content package creation process. The process determines if the request includes content 515, such as text content, image content, video content, audio content, or the like, and if so, further determines if the embedded_request flag is set to true 520, and if the content_type value is an embedded support value 525. If any of the aforementioned conditions are false or in the negative, the process proceeds to non-embedded content container package creation process beginning with determining if the source_specific flag is set to true 535, and if so, executing any applicable source specific actions associated with the content source 540 and creating a side care file 545, which is added to a created content package 550, 555, along with the content file 560. In some embodiments, at least a portion of the side care file data is embedded in the content container. By contrast, if all the conditions are true, the process embeds at least a portion of the content in accordance with embedding rules associated with the content_type 530, further determining if the source_specific flag is set to true 565, and if so, executing any applicable source specific actions associated with the content source 570 and creating a side care file 575. In some instances, at least a portion of the side car file data is added as metadata to the native content file. An associated registry database record is created 580, and a plurality of registry database record attribute values are set 585 for the record based on characteristics associated with the content, content container, content container package, source generating system, user, region, applicable laws, digital rights, and the like. A request status message is then returned to the requestor 590, and if successful, along with the generated content container package 595. A first set of logging associated attribute values are set for the content container in the registry database 599.

Figure 6A:
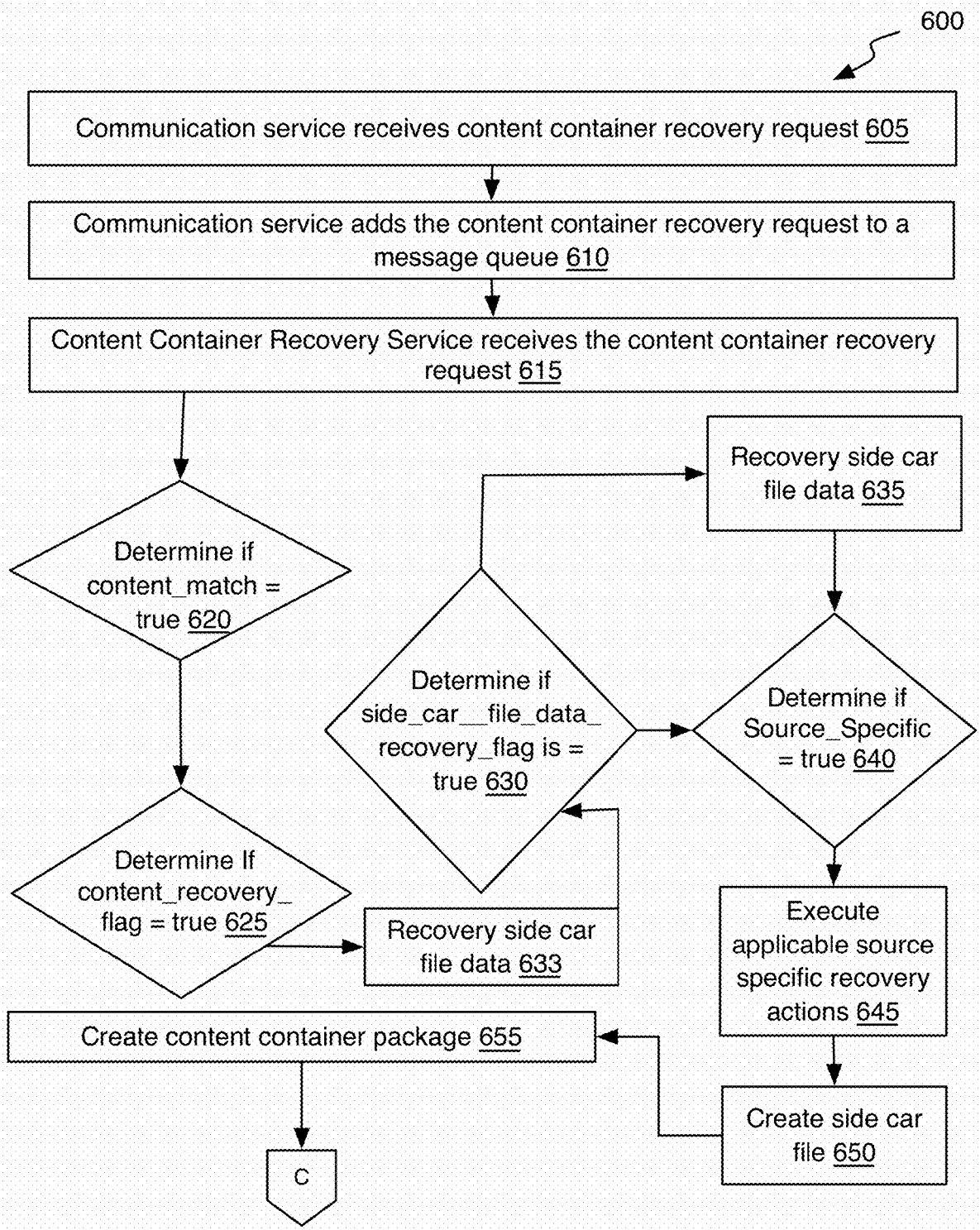
FIG. 6A and FIG. 6B are flowcharts of the package recovery processing operations and activities performed by the Package Recovery Service and other services of FIG. 4 in the content tracking system of FIG. 1.
Figure 6B:
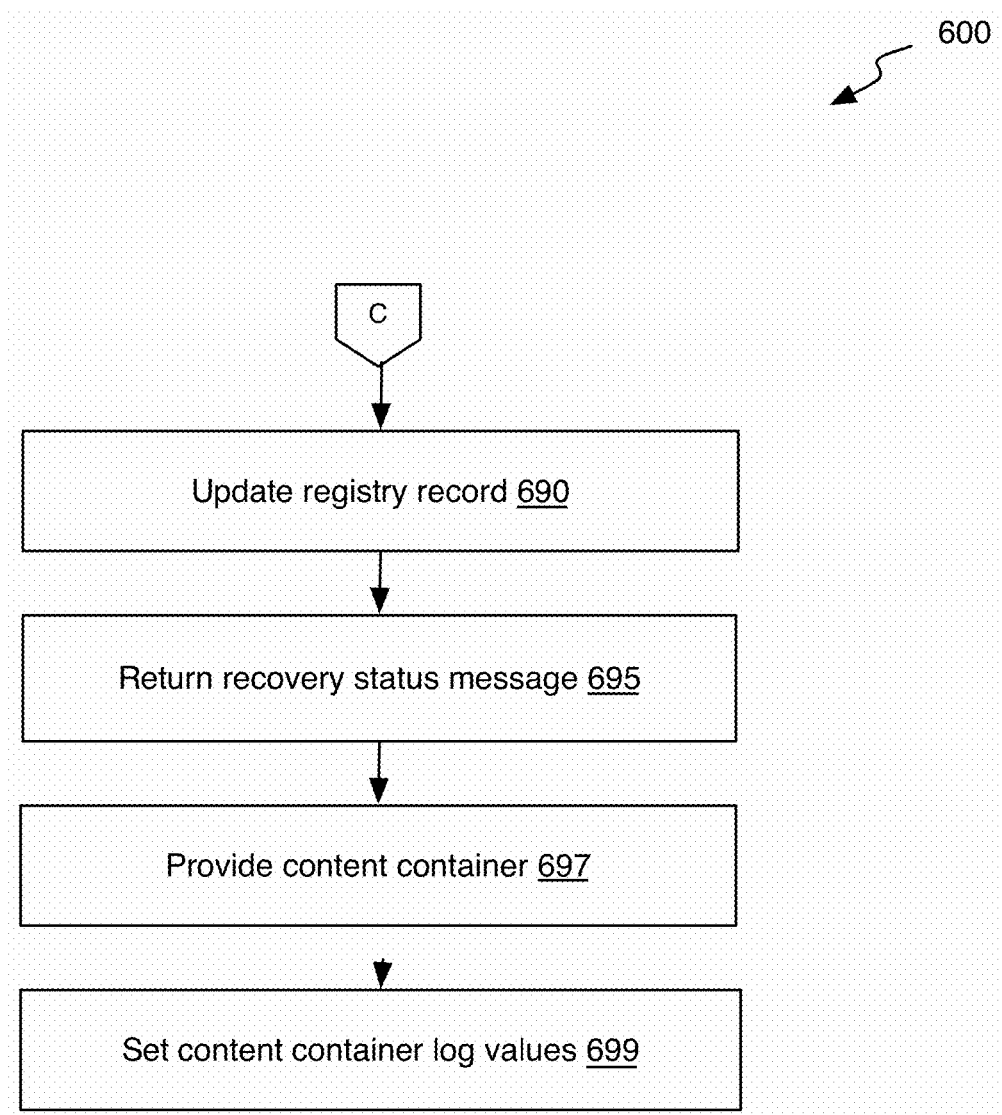

Referring now to FIG. 6A and FIG. 6B, in some embodiments, the content tracking system provides for content container recovery 600. The communication service 410 receives a content container recovery request 605, such as from the content container support app 190. The communication service 410 then places the request in a message queue 610, which then delivers the message to the relevant service or services. The content container recovery service 455 receives the request 615 and initiates the content recovery process. The process determines if the content container content matches, at least to an acceptable measure or degree, the content identifying fingerprint stored in the generative content registration database 135, the content container repository 130, or both 620, and if so, further determines if the content_recovery_flag is set to true 625, indicating that content is to be recovered, and if the side_car_data_recovery_flag is set to true 630, indicating the side car data is to be recovered. The content, side car file data, or both, are recovered in accordance with the flags 633, 635. The process proceeds to content container package creation process beginning with determining if the source_specific flag is set to true 640, and if so, executing any applicable source specific actions associated with the content source 645 and creating the content container package 650, 655. The associated registry database record is updated 690, and a recovery status message is then returned to the requestor 695, and if successful, along with the recovered content container package 697. Associated logging attribute values are set for the content container in the registry database 699.

Figure 7:
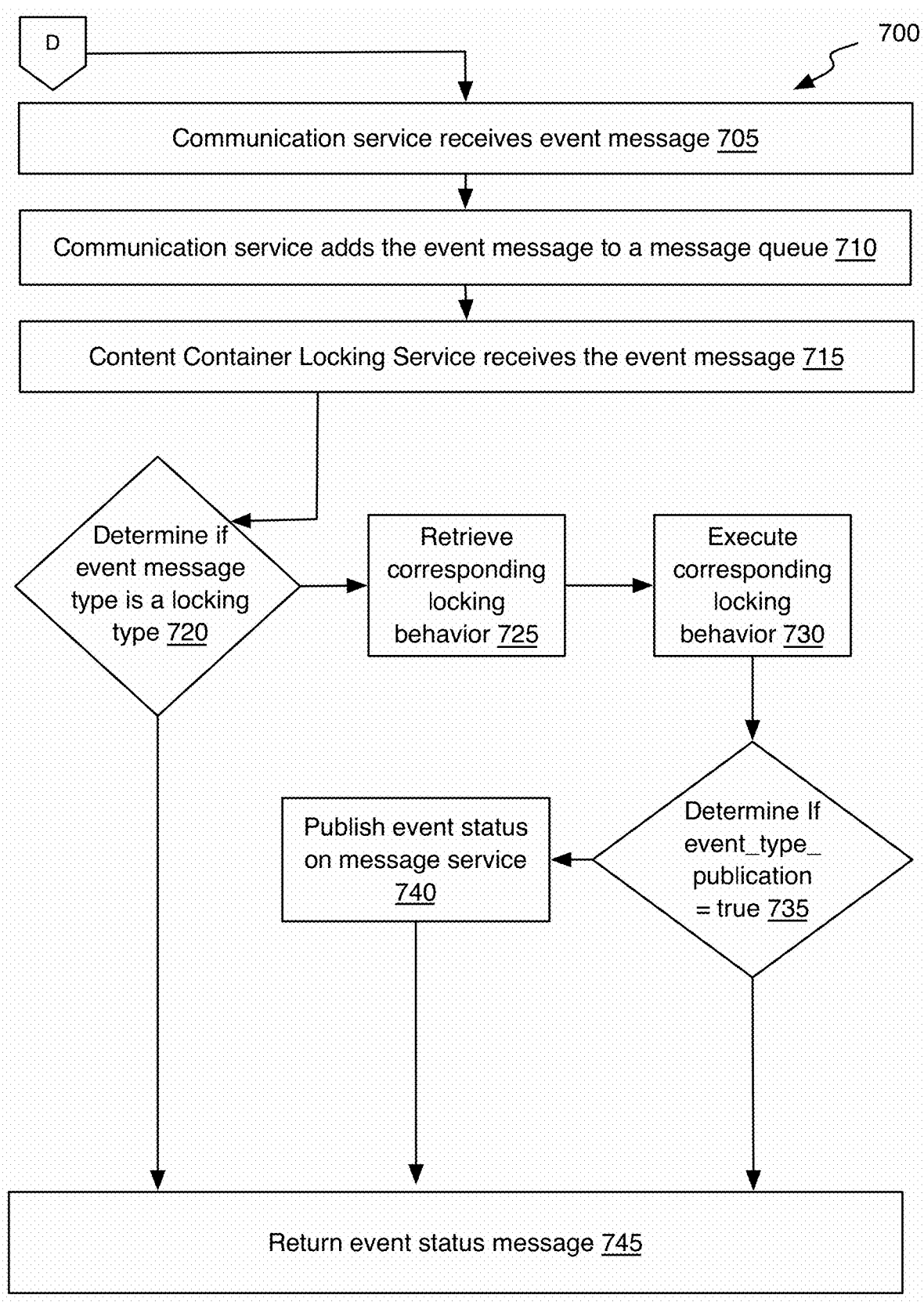
FIG. 7 is a flowchart of the content locking processing operations and activities performed by the Generated Content Locking Service and other services of FIG. 4 in the content tracking system of FIG. 1.

Referring now to FIG. 7, in some embodiments, the content tracking system provides for content container locking 700. The communication service 410 receives an event message 705, such as from the content container support app 190. The communication service 410 then places the event in a message queue 710, which then delivers the message to the relevant service or services. The content container locking service 465 receives the event 715 and initiates the content locking process. The process determines if the event message type is a locking type 720, and if so, retrieves the corresponding locking behavior from one of the system databases 725, and executes the corresponding locking behavior 730. The process proceeds to determine if the event_type_publication=true 735, and if so, publishes the event status 740 on a message service 605, such as a publish/subscribe service 120. An event status message is then returned to the originator of the event 745.

Figure 8:
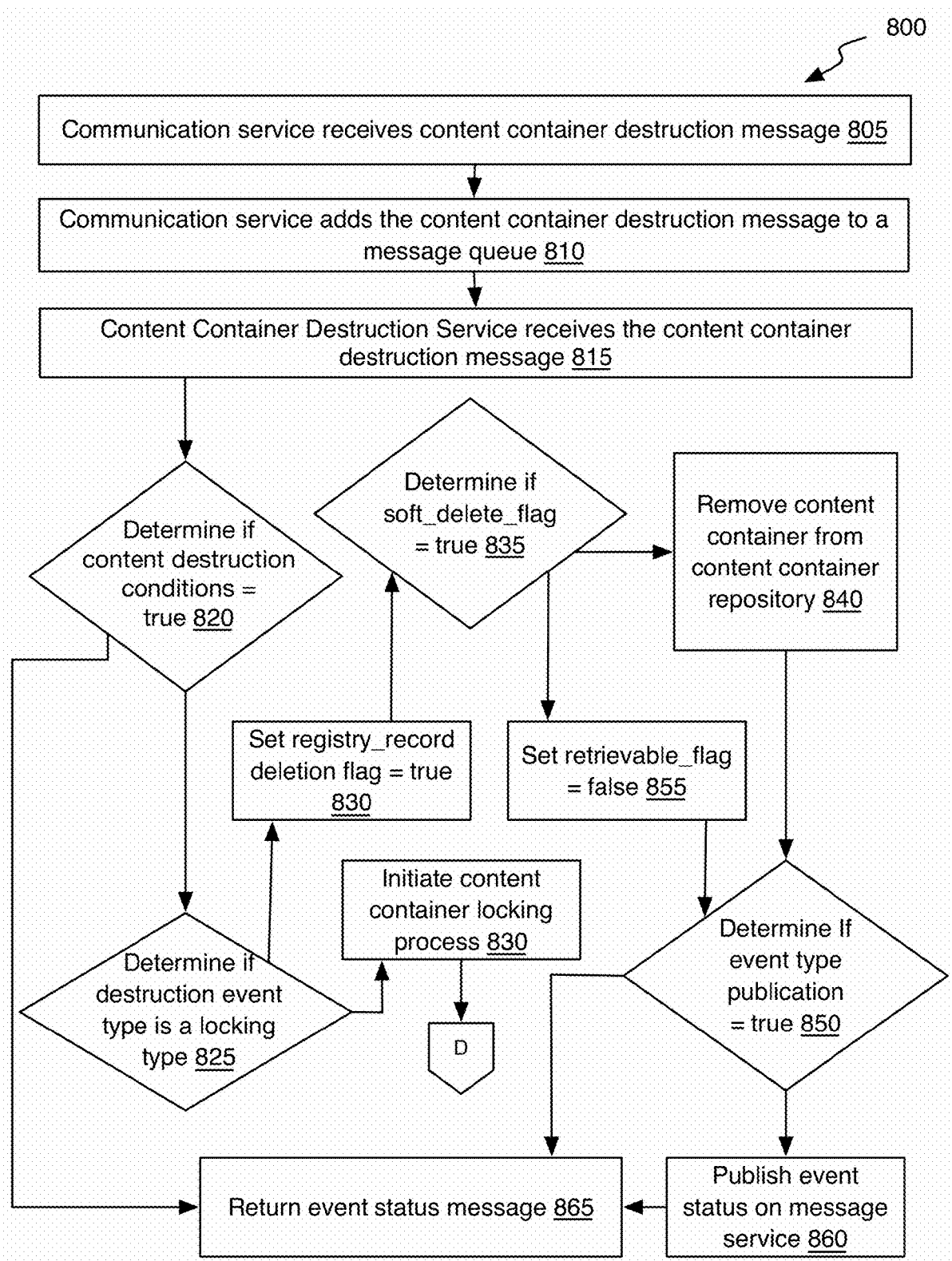
FIG. 8 is a flowchart of the content destruction processing operations and activities performed by the Generated Content Destruction Service and other services of FIG. 4 in the content tracking system of FIG. 1.

Referring now to FIG. 8, in some embodiments, the content tracking system provides for content container destruction 800. The communication service 410 receives a content container destruction message 805, such as from the content container support app 190. The communication service 410 then places the event in a message queue 810, which then delivers the message to the relevant service or services. The content container destruction service 445 receives the message 815 and initiates the content destruction process. The process determines if there are any content destruction conditions, and if so, if those conditions are met 820, and then proceeds to determine if the destruction event type is a locking type 825. If it is a locking event type rather than a destruction type, the process initiates the content container locking process 830. If it is a destruction event type rather than a locking type, the process proceeds to determine if the soft_delete_flag is set to true 835, and if so, sets the retreivable_flag to false 855 such that the content container related data is not retrievable but is retained in one or more data stores. By contrast, if the process determines that the soft_delete_flag is set to false 835, the content container and any content container related data is deleted from all data stores 840. In some cases, at least a portion of the content related data is retained in the registry database. The process proceeds to determine if the event_type_publication=true 850, and if so, publishes the event status 860 on a message services 605, such as a publish/subscribe service 120. An event status message is then returned to the originator of the request 865.

Figure 9:
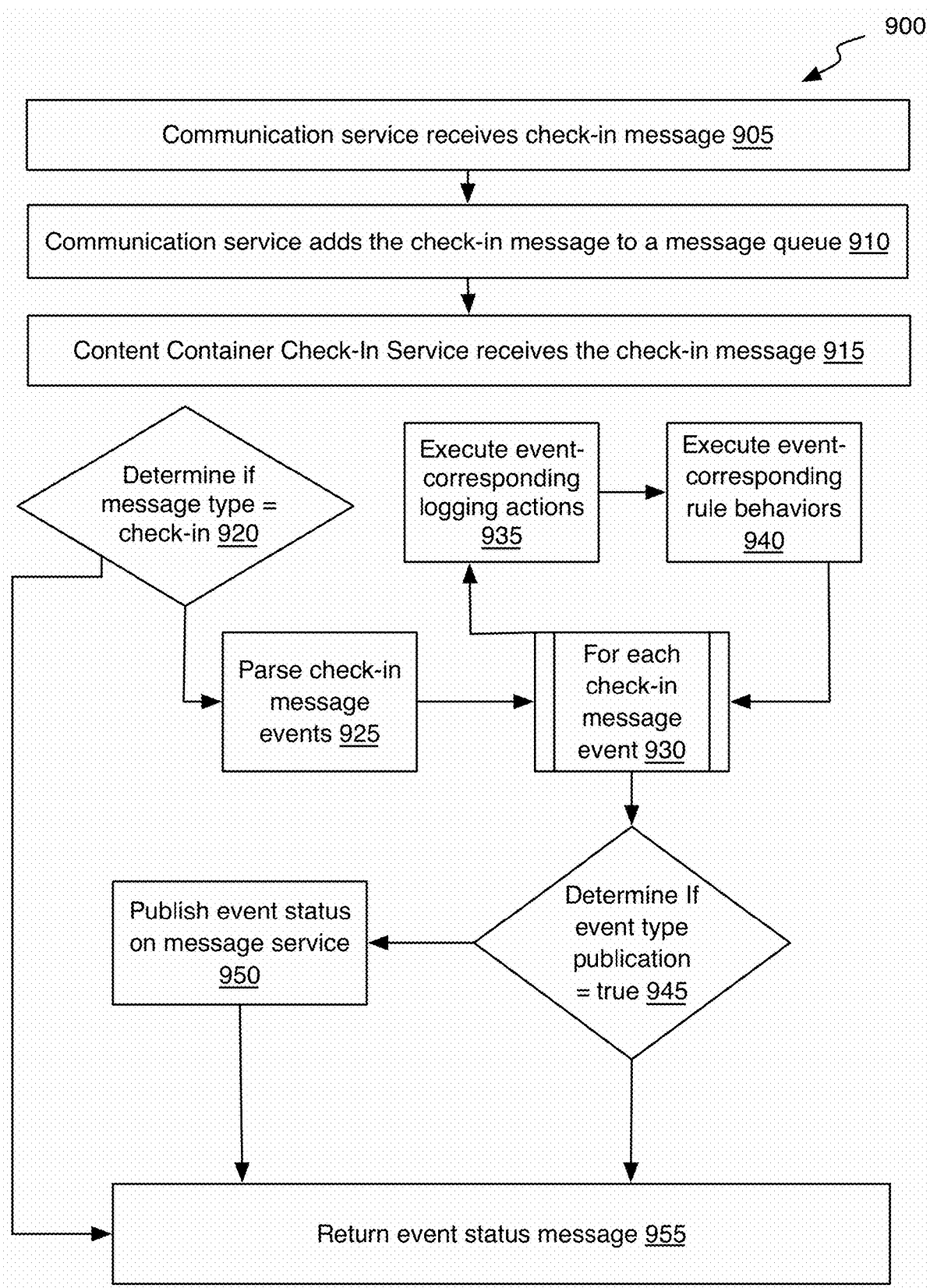
FIG. 9 is a flowchart of the content check-in processing operations and activities performed by the Generated Content Check-In Service and other services of FIG. 4 in the content tracking system of FIG. 1.

Referring now to FIG. 9, in some embodiments, the content tracking system provides for content container check-in 900. The communication service 410 receives a content container check-in message 905, such as from the content container support app 190. The communication service 410 then places the event in a message queue 910, which then delivers the message to the relevant service or services. The content container check in service 440 receives the message 915 and initiates the content check-in process. The process determines if the message type is check-in 920, and if so, parses the check-in message events 925. For each checkin message event 930, the process executes event-corresponding logging actions 935, and executes event-corresponding rule behaviors 940. Once all passed check-in message events have been processed, the process proceeds to determine if the event_type_publication=true 945, and if so, publishes the event status 950 on a message services 605, such as a publish/subscribe service 120. An event status message is then returned to the originator of the request 955.

Figure 10:
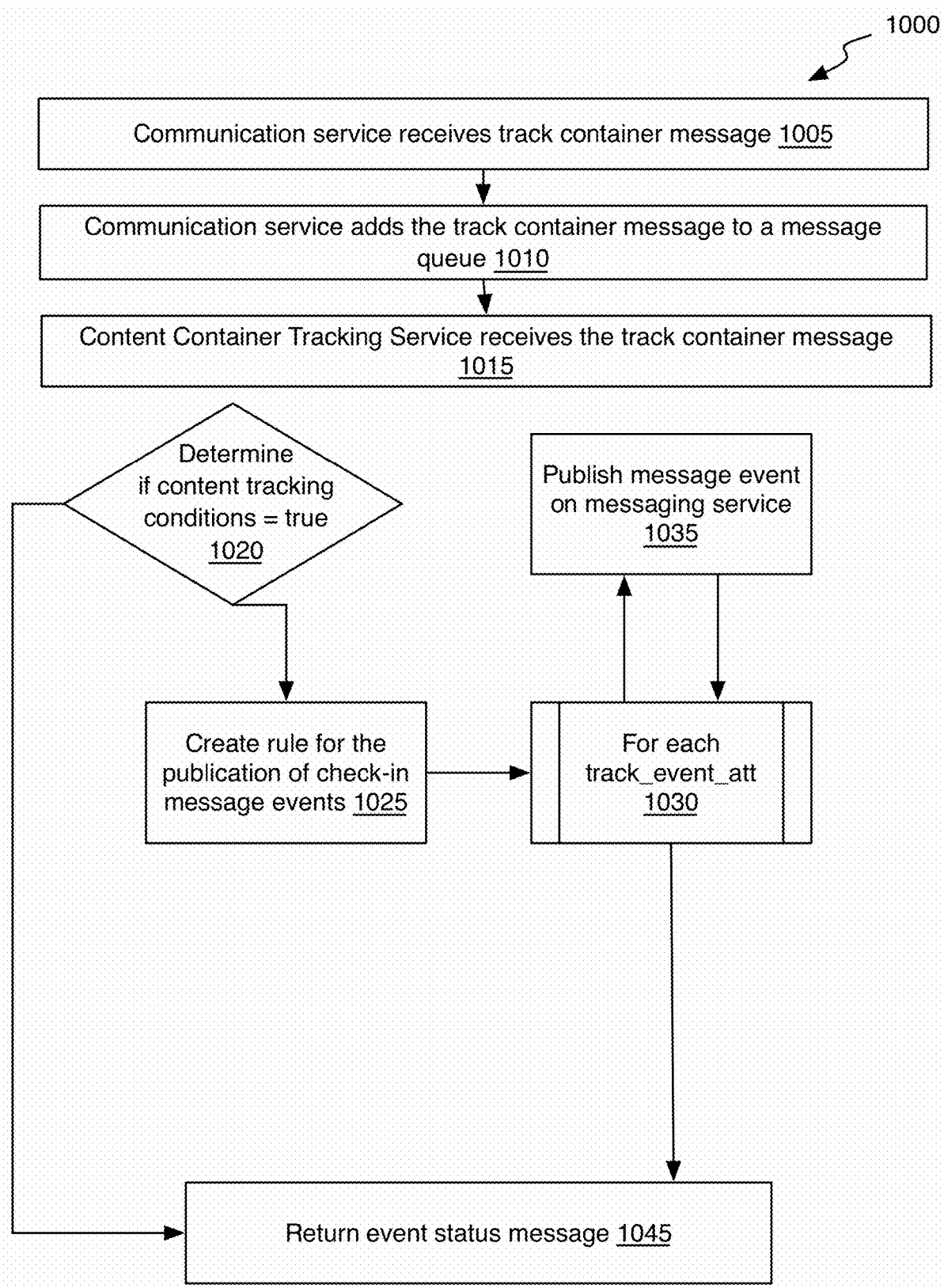
FIG. 10 is a flowchart of the content container tracking processing operations and activities performed by the Content Container Tracking Service and other services of FIG. 4 in the content tracking system of FIG. 1.

Referring now to FIG. 10, in some embodiments, the content tracking system provides for content container tracking 1000. The communication service 410 receives a content container tracking message 1005, such as from the content container support app 190. The communication service 410 then places the event in a message queue 1010, which then delivers the message to the relevant service or services. The content container tracking service 435 receives the message 1015 and initiates the content tracking process. The process determines if there are associated tracking conditions, and if these tracking conditions are met 1020, and if so, creates a rule for the publication of check-in message events 1025. For each trackable attribute identified in the tracking message 1030, a rule is created or an existing rule is enhanced for the publication of message associated with each track event 1035. An event status message is then returned to the originator of the request 1045.

Figure 11:
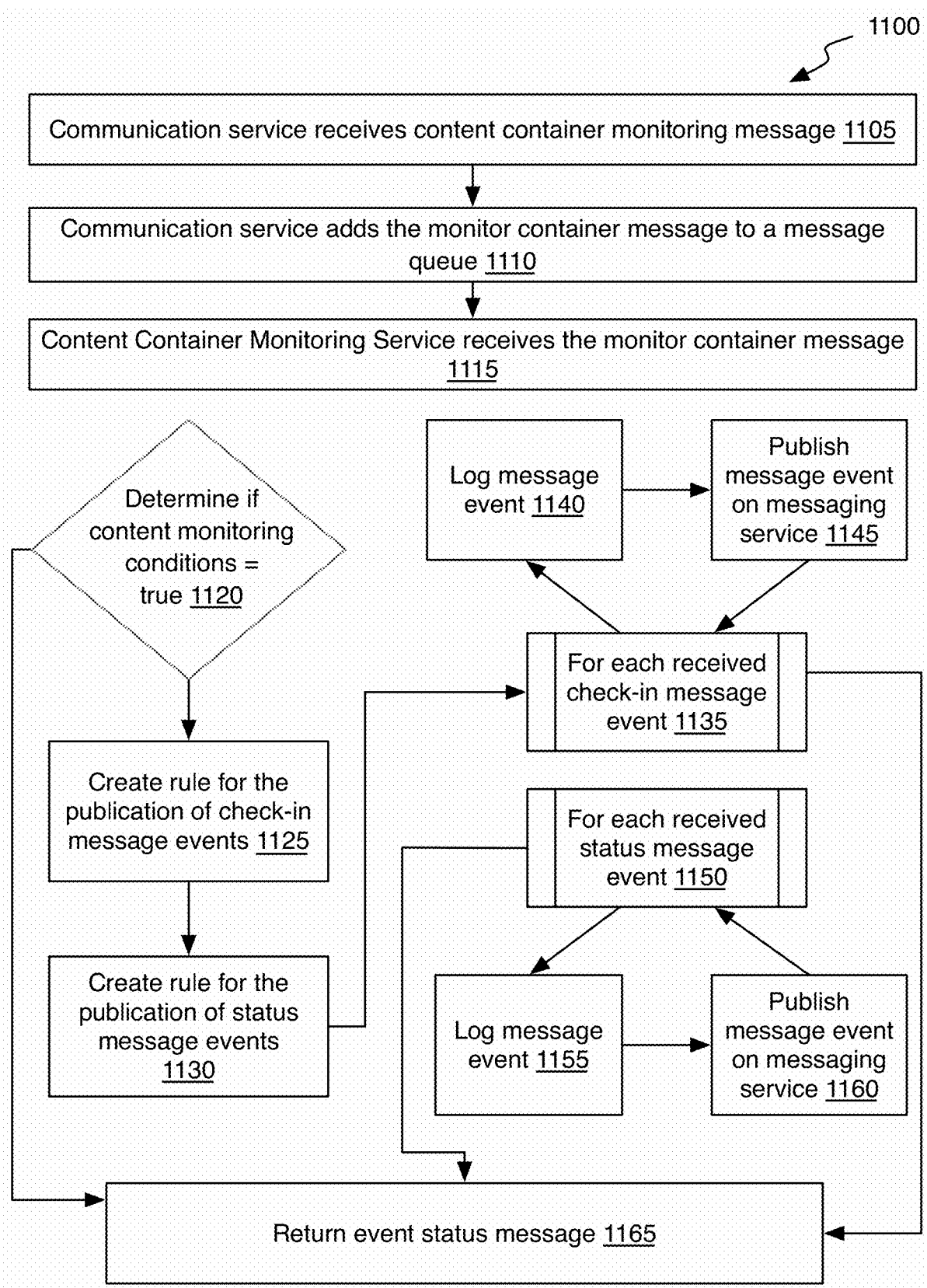
FIG. 11 is a flowchart of the content container monitoring processing operations and activities performed by the Content Container Monitoring Service and other services of FIG. 4 in the content tracking system of FIG. 1.

Referring now to FIG. 11, in some embodiments, the content tracking system provides for content container monitoring 1100. The communication service 410 receives a content container monitoring message 1105, such as from the content container support app 190. The communication service 410 then places the event in a message queue 1110, which then delivers the message to the relevant service or services. The content container monitoring service 460 receives the message 1115 and initiates the content monitoring process. The process determines if there are associated monitoring conditions, and if these monitoring conditions are met 1120, and if so, creates rules for the publication of status and check-in message events 1125, 1130, where, for each check-in message event and each status event message 1135, 1150, the rule logs the message event 1140, 1155 and publishes the message event on a messaging service 1145, 1160. An event status message is then returned to the originator of the request 1165.

Figure 12:
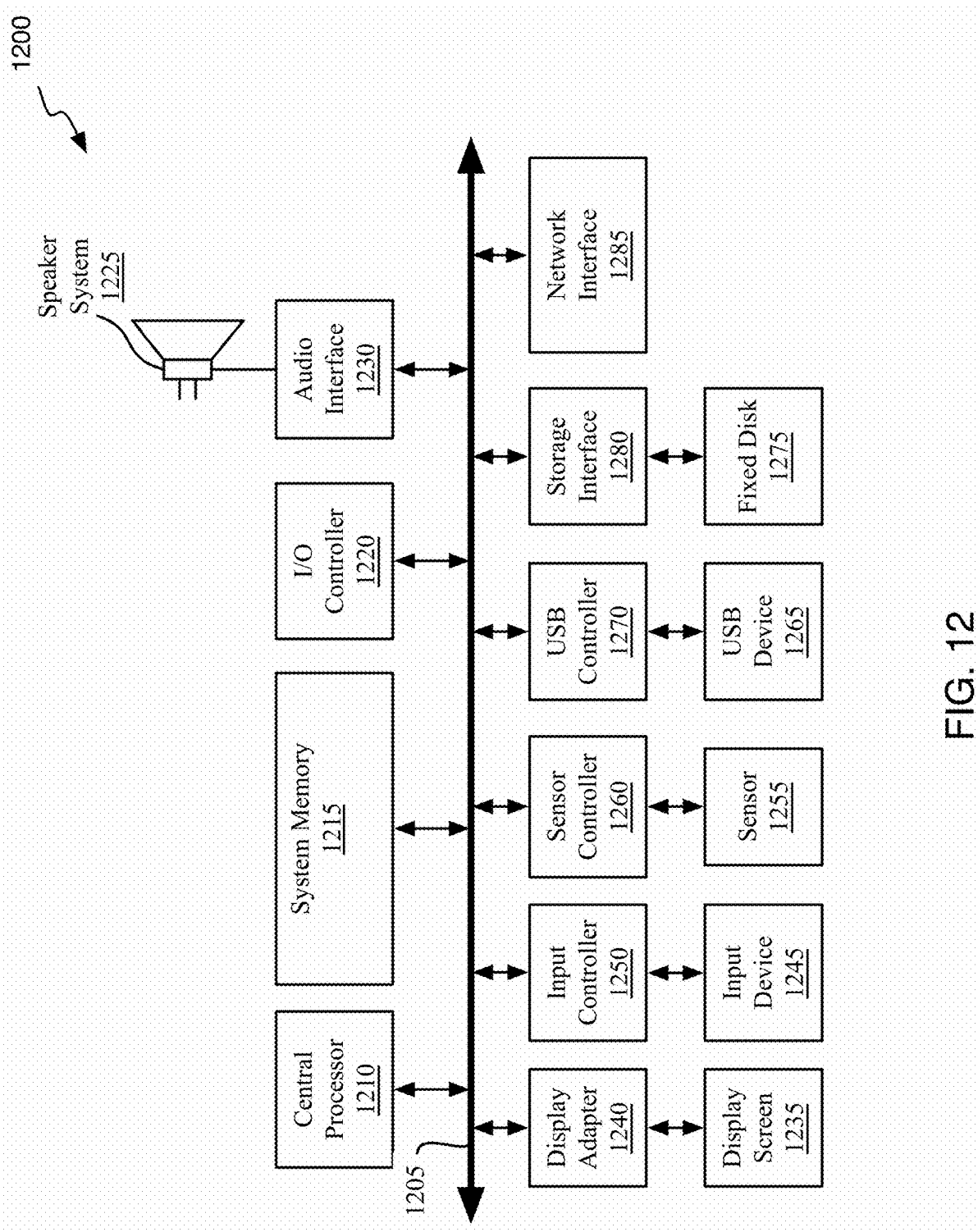
FIG. 12 is a block diagram of a computer system suitable for implementing the operations of the content tracking system of FIG. 1.
Figure 13:
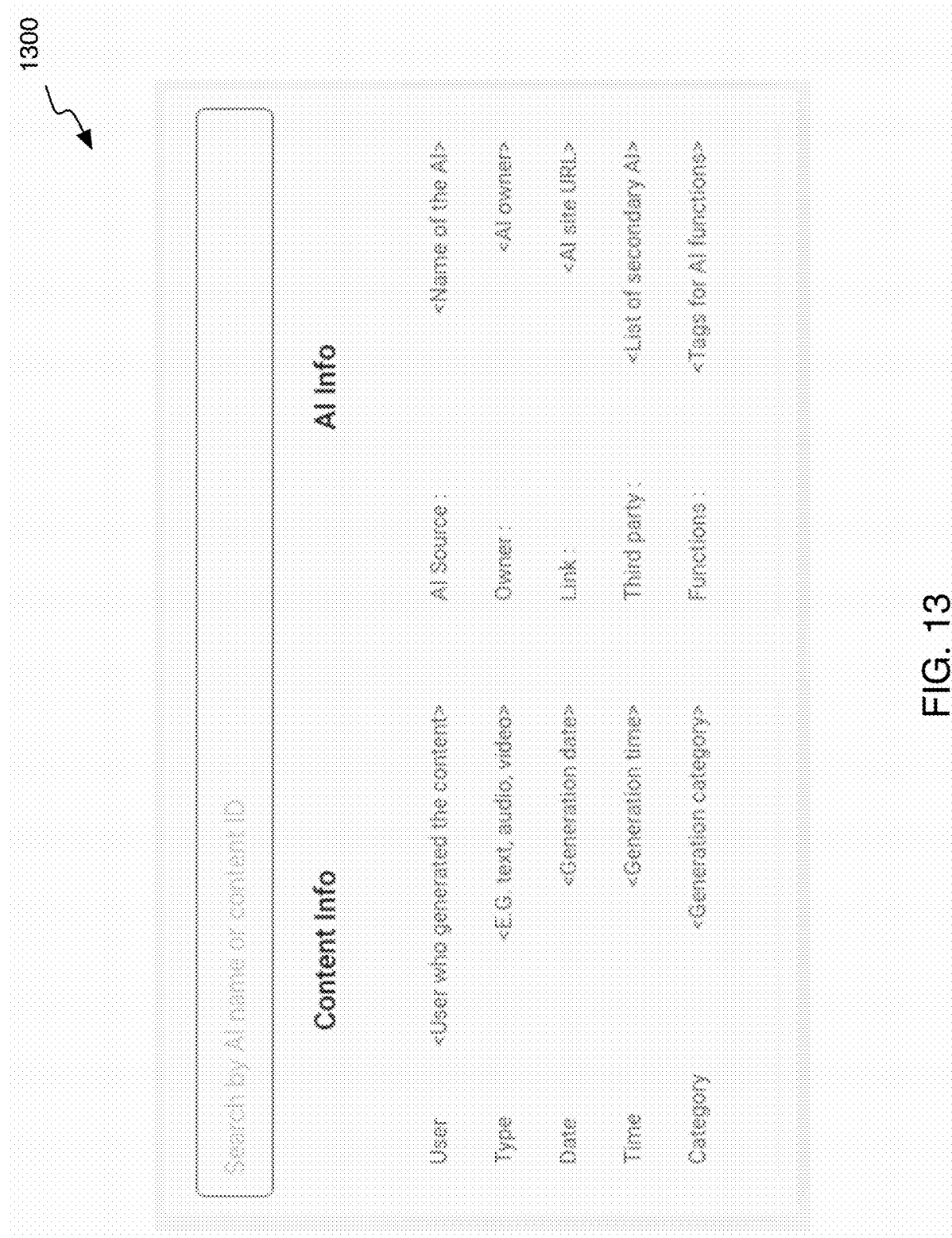
FIG. 13 is a screenshot of a generative content registration database search view of the content tracking system of FIG. 1.
Figure 14:
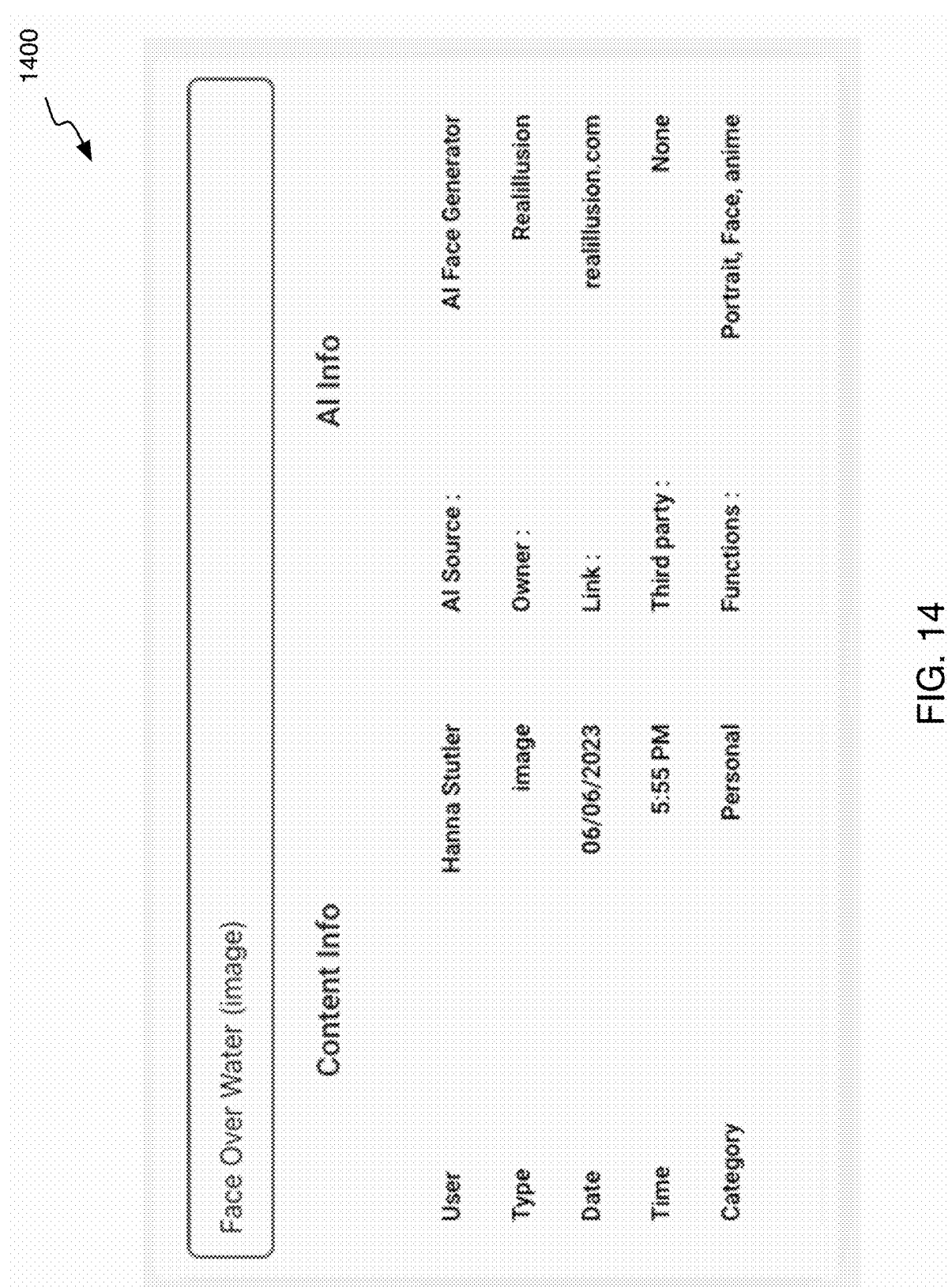
FIG. 14 is a screenshot of a generative content registration database image content search results view of the content tracking system of FIG. 1.
Figure 16:
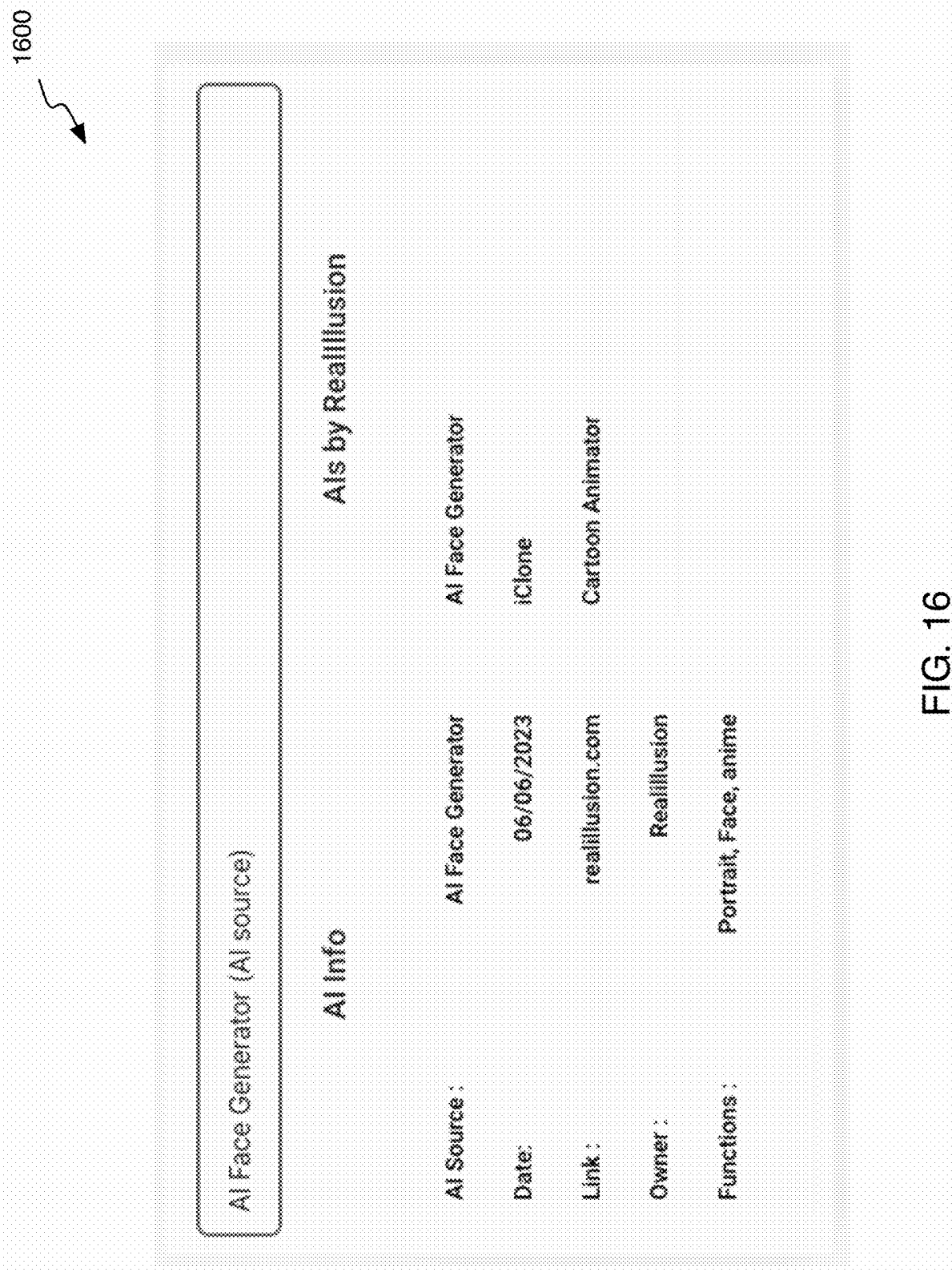
FIG. 16 is a screenshot of a generative content registration database AI source search results view of the content tracking system of FIG. 1.
Figure 17:
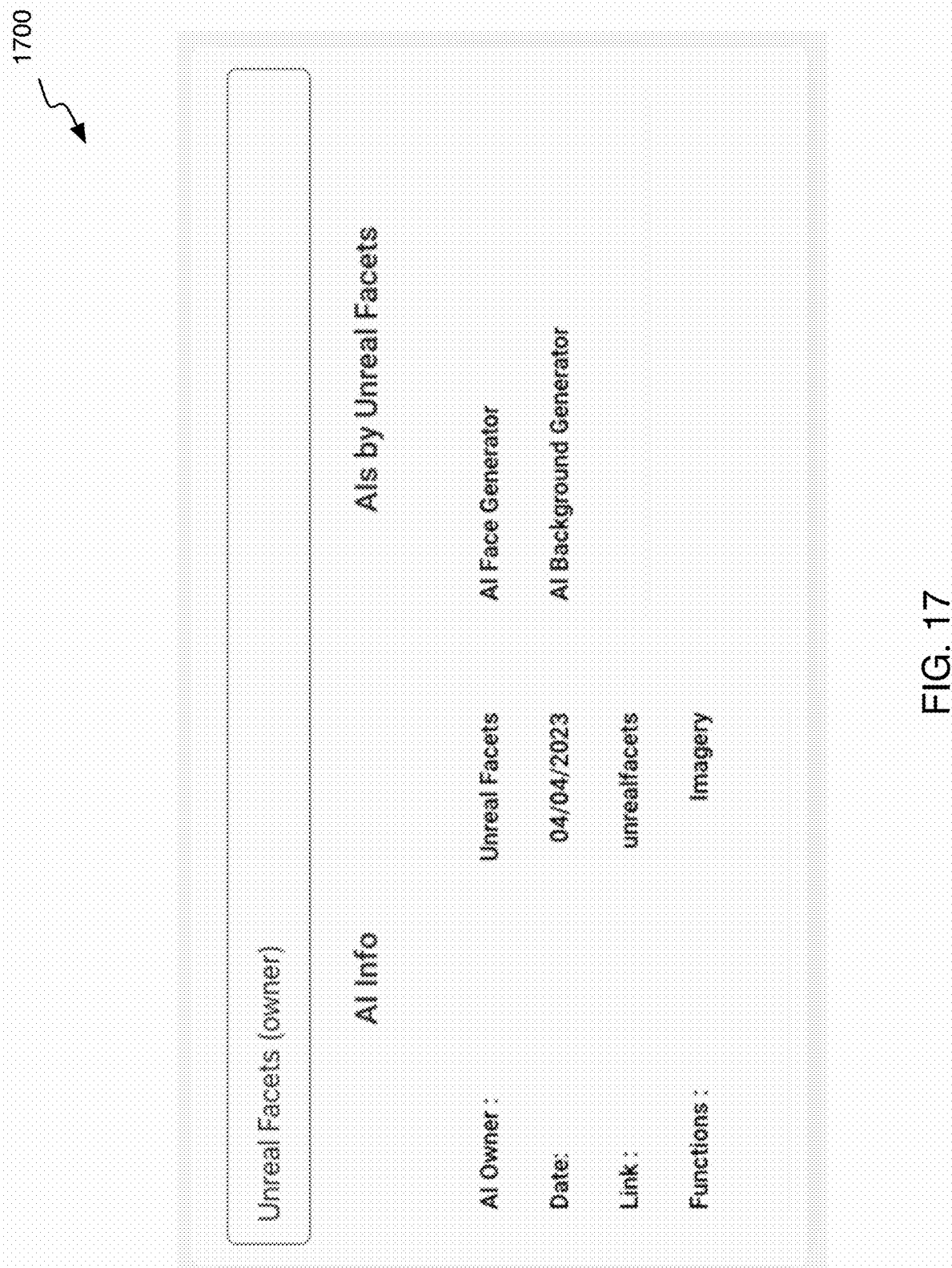
FIG. 17 is a screenshot of a generative content registration database owner search results view of the content tracking system of FIG. 1.
Figure 18:
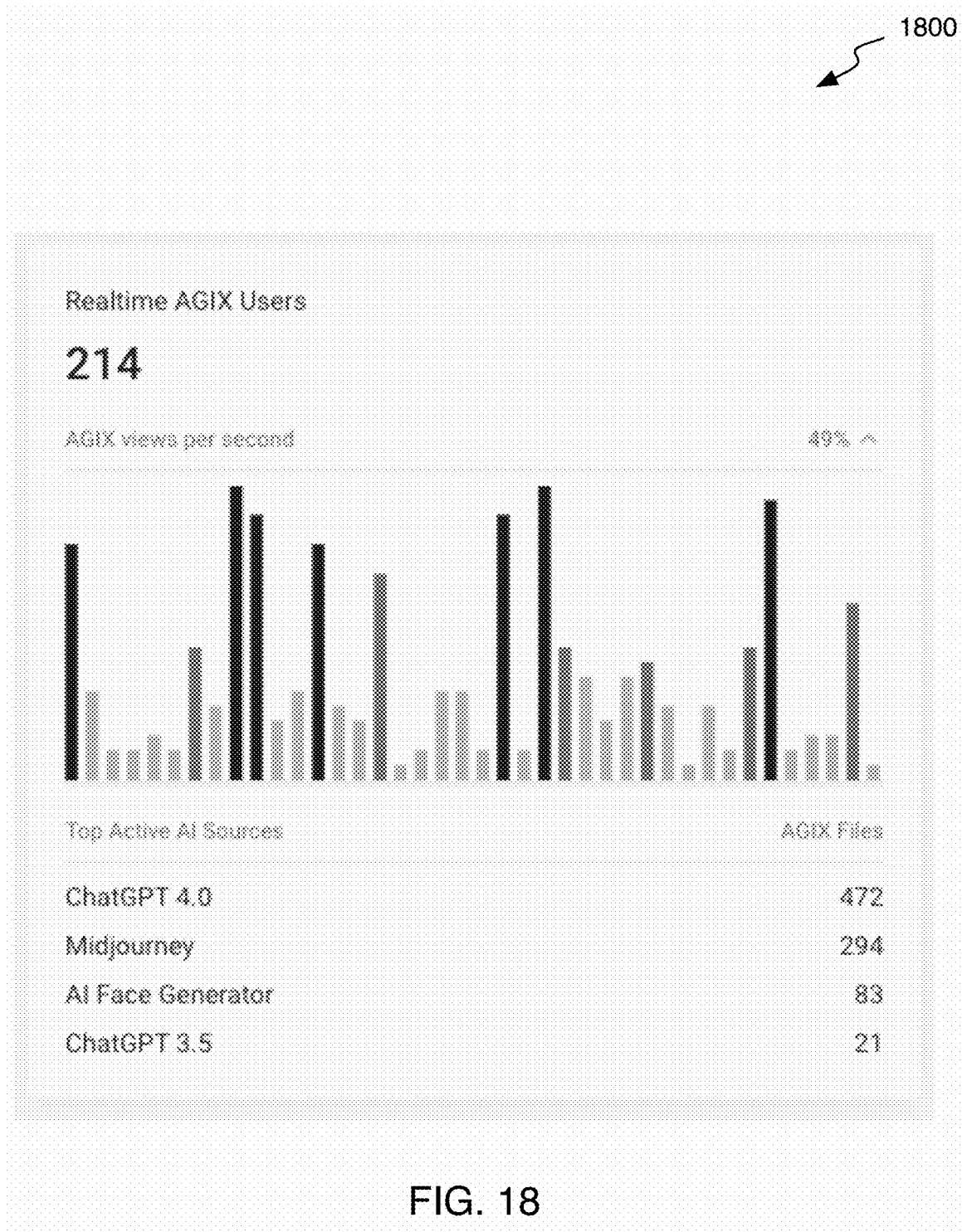
FIG. 18 is a screenshot of an analytics view of the content tracking system of FIG. 1.
Figure 19:
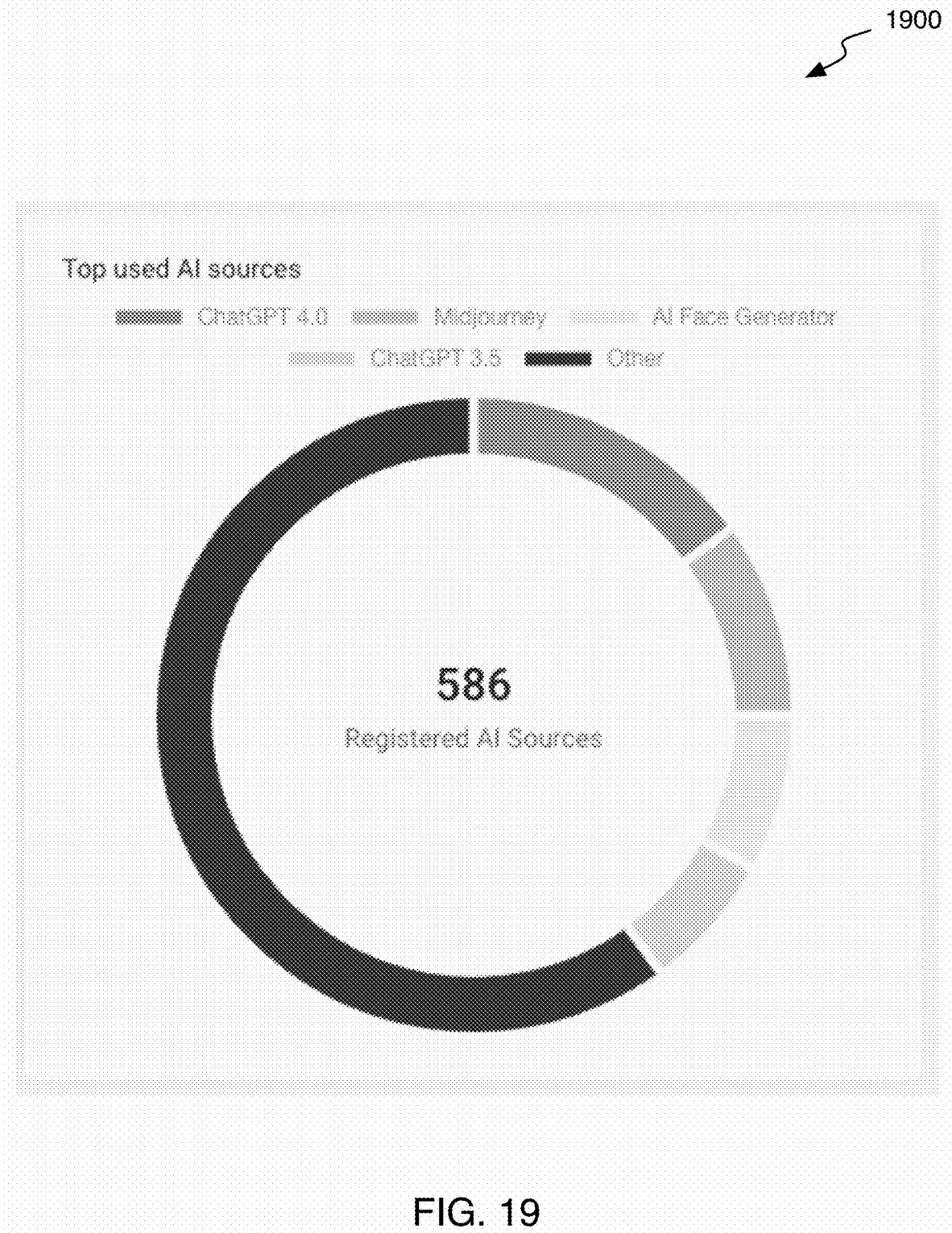
FIG. 19 is a screenshot of another analytics view of the content tracking system of FIG. 1.
Figure 20:
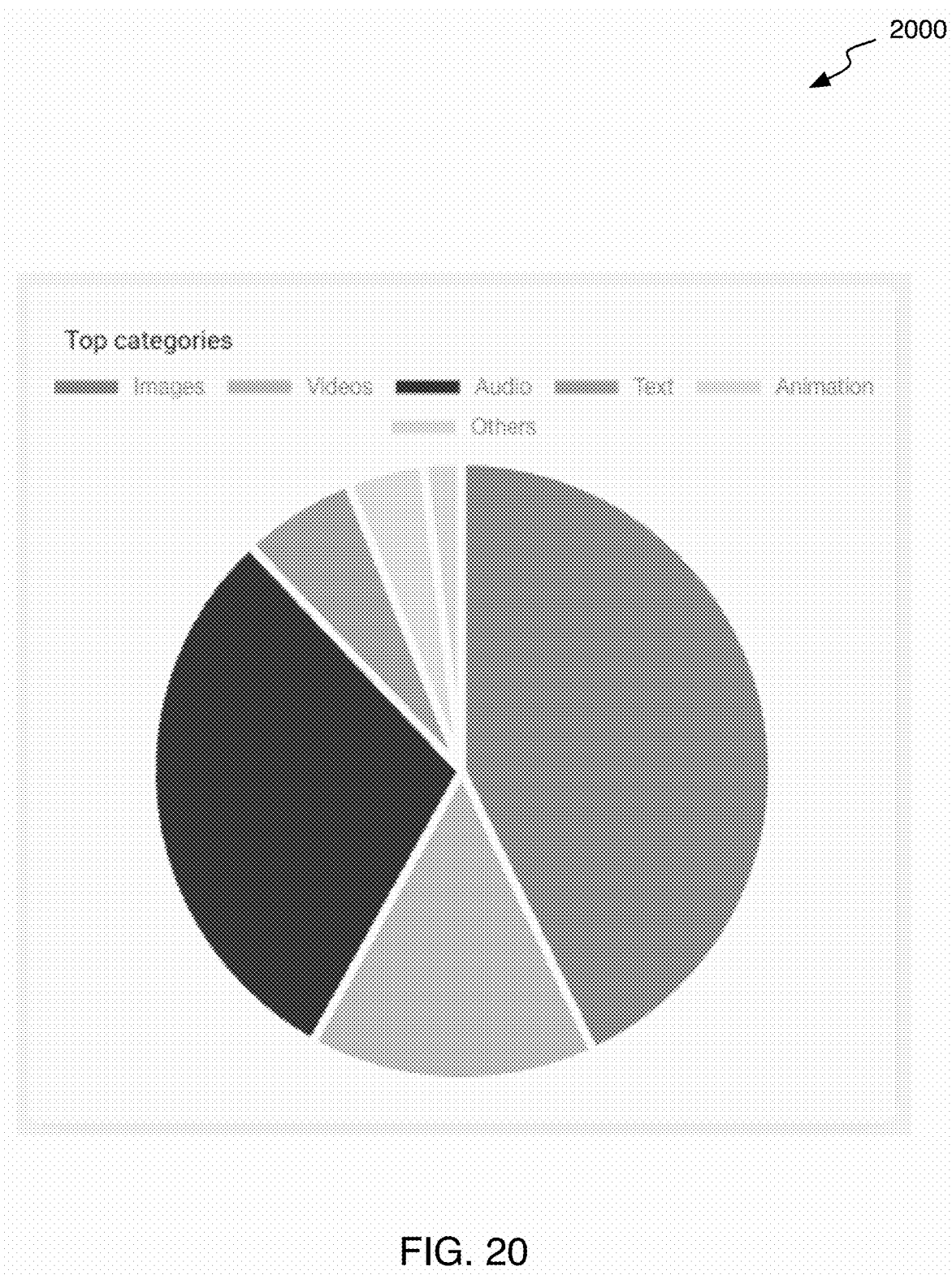
FIG. 20 is a screenshot of another analytics view of the content tracking system of FIG. 1.
Figure 21:
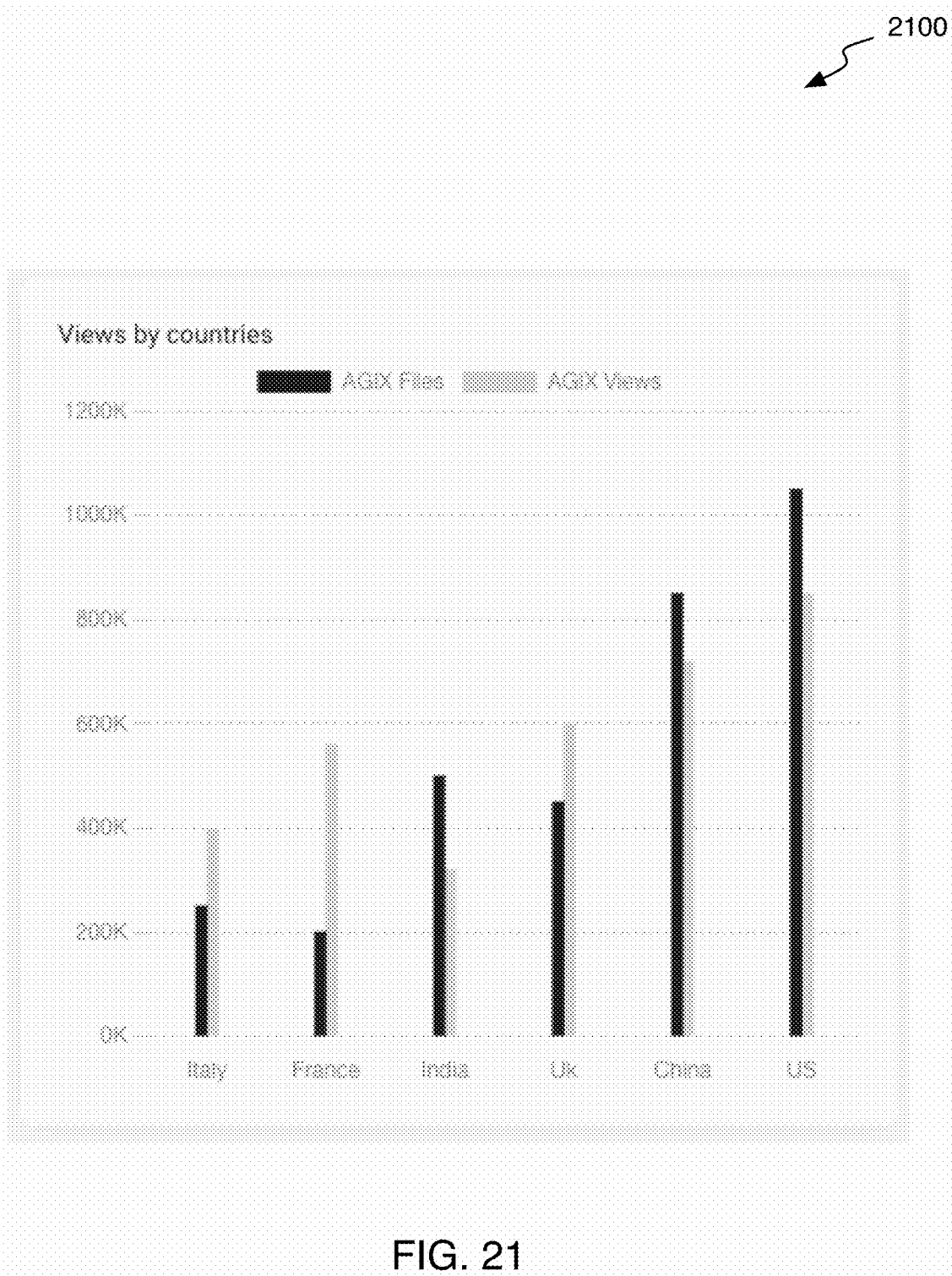
FIG. 21 is a screenshot of another analytics view of the content tracking system of FIG. 1.
Figure 22:
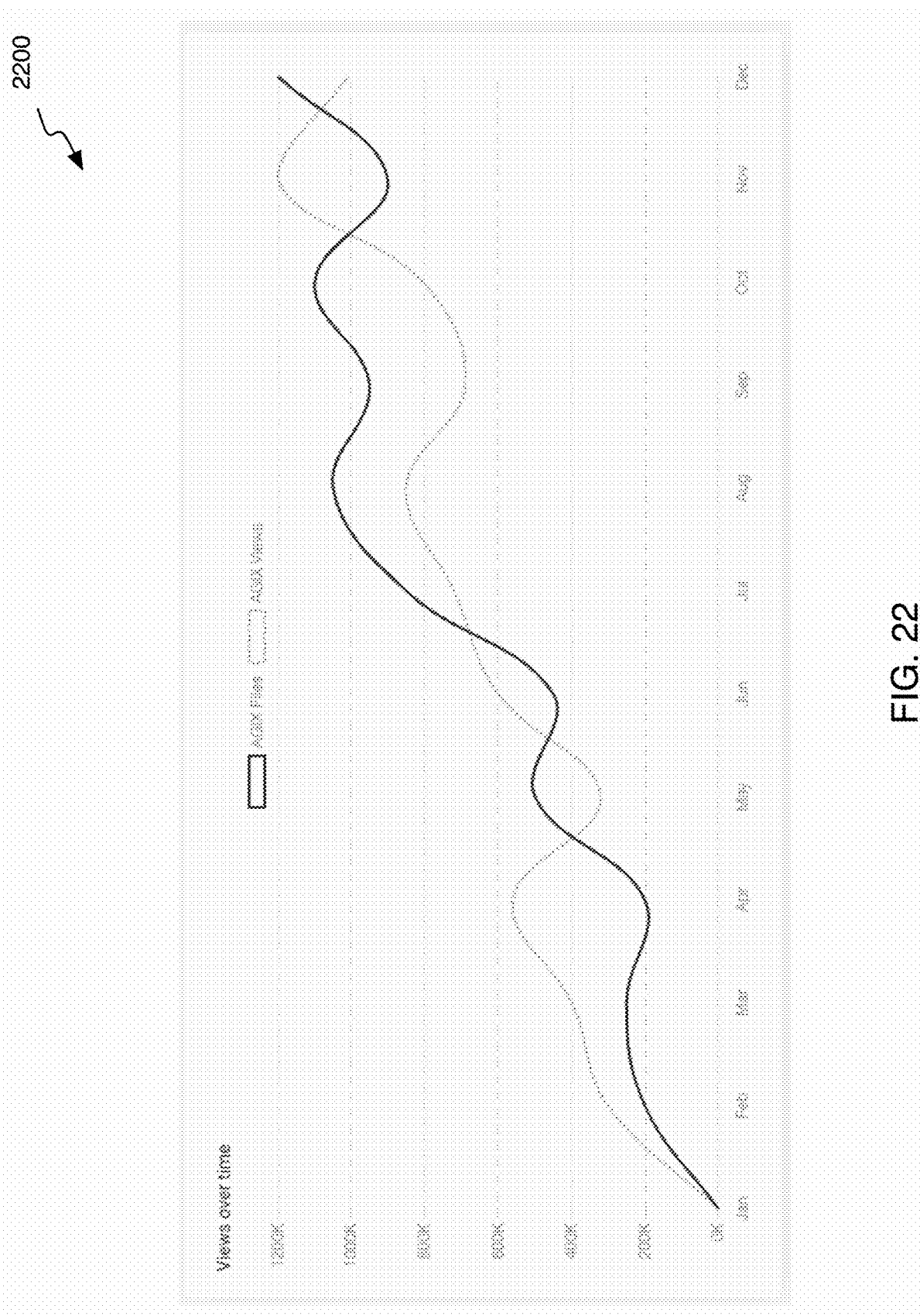
FIG. 22 is a screenshot of another analytics view of the content tracking system of FIG. 1.
Figure 23:
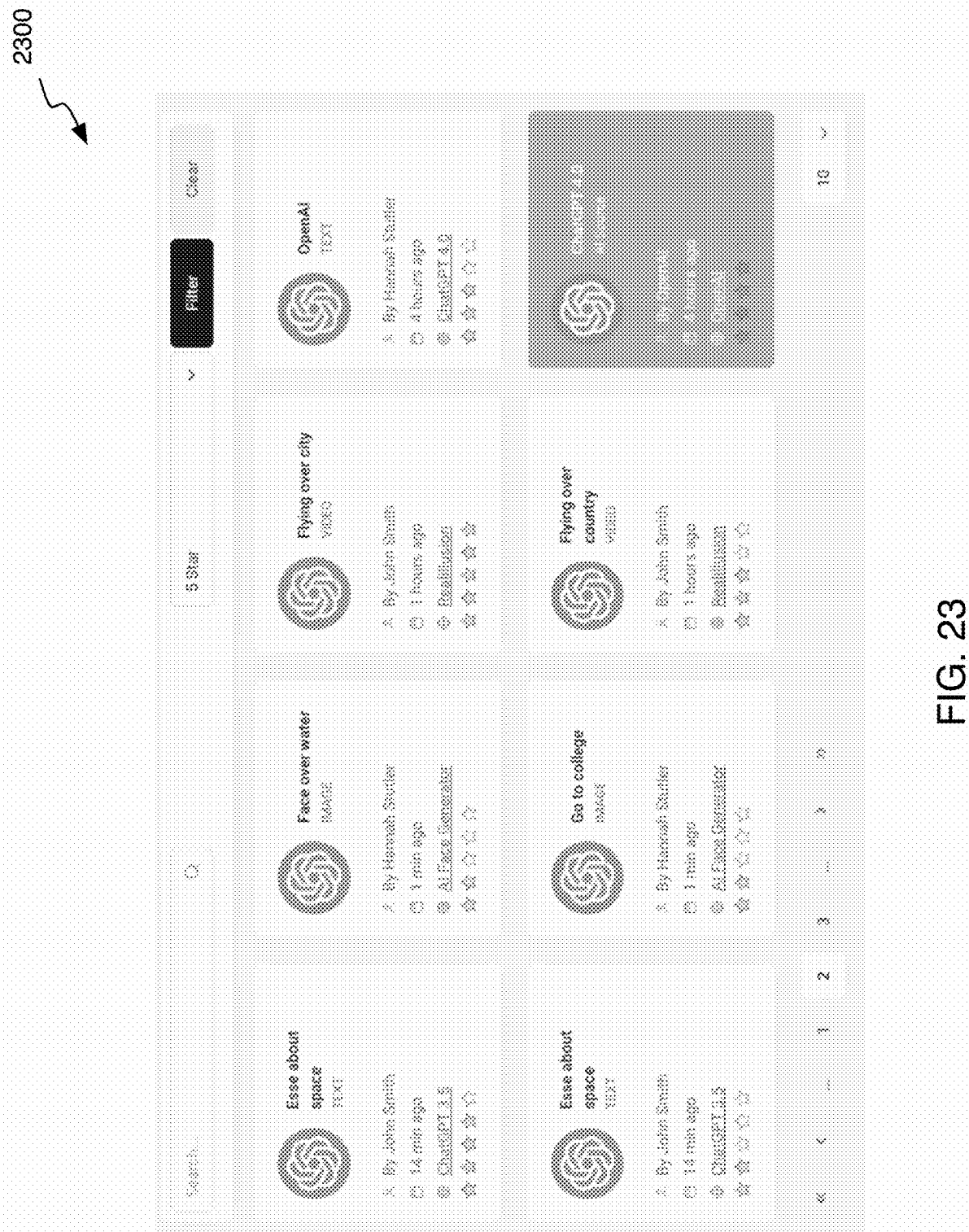
FIG. 23 is a screenshot of another analytics view of the content tracking system of FIG. 1.
Figure 25:
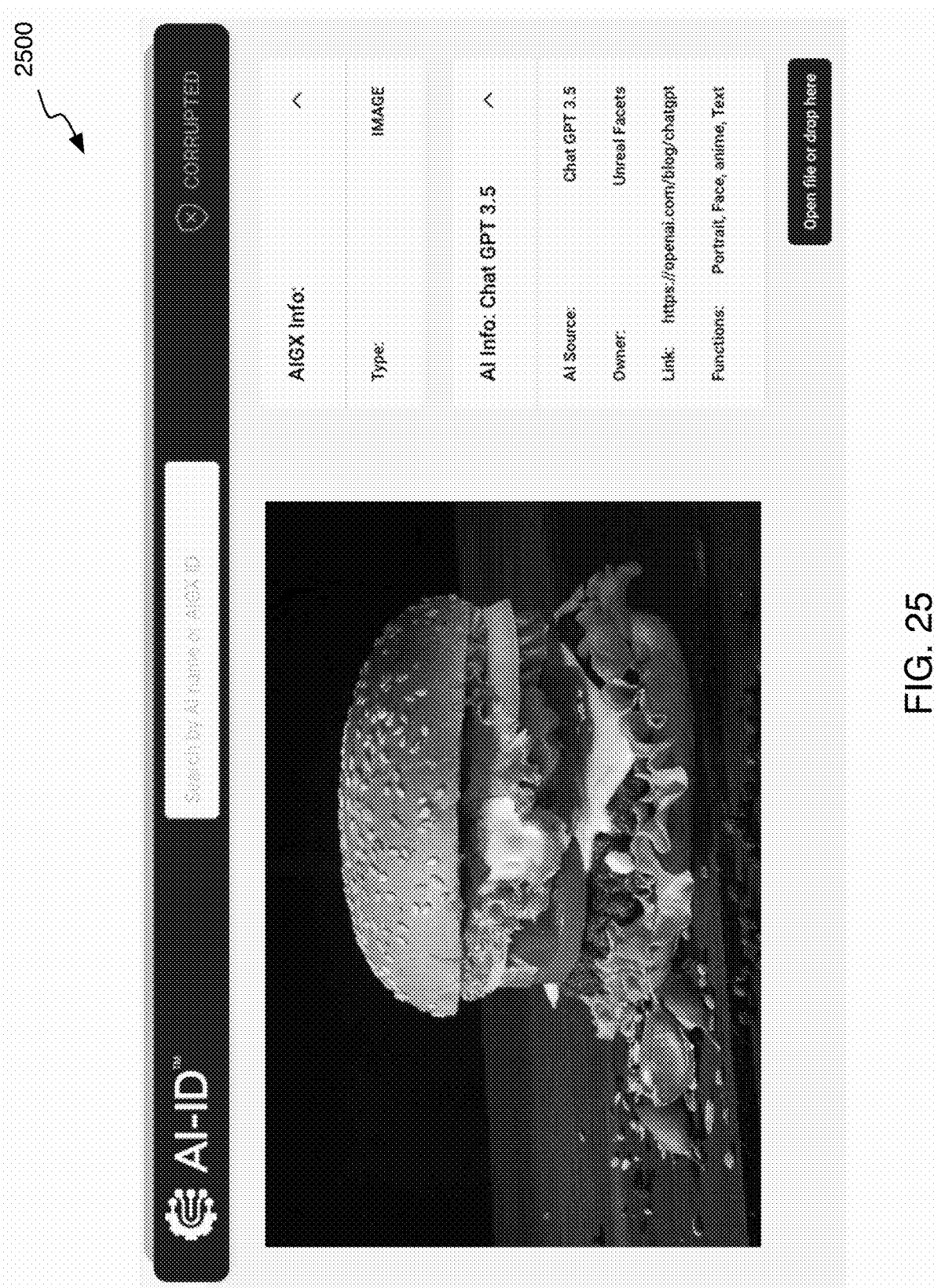
FIG. 25 is a screenshot of the content container viewing app interface of FIG. 24 displaying the contents of a content container containing image-related content.
Figure 26:
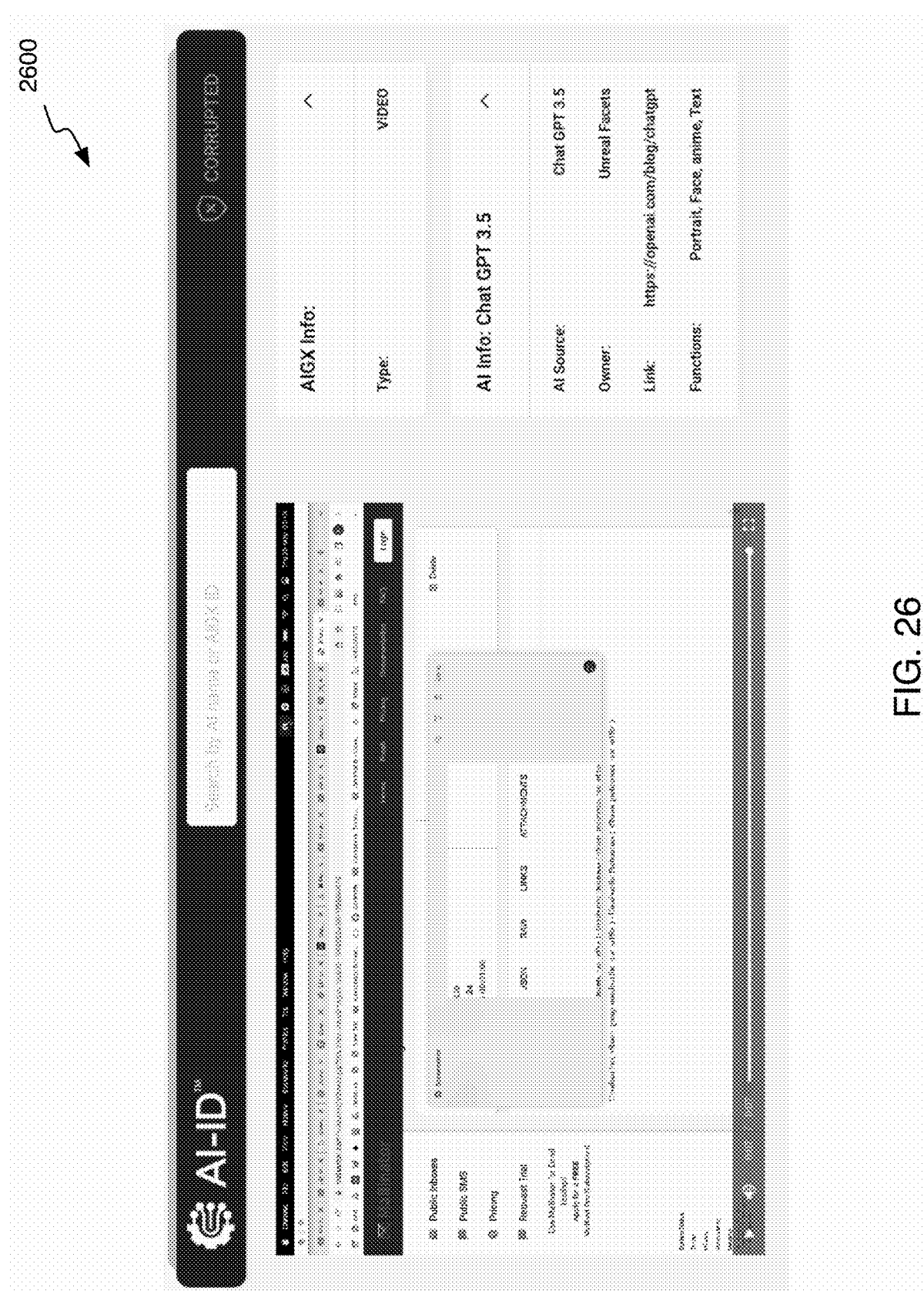
FIG. 26 is a screenshot of the content container viewing app interface of FIG. 24 displaying the contents of a content container containing video-related content.
Figure 27:
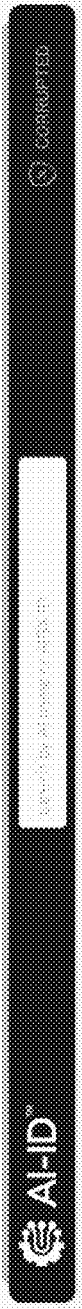
FIG. 27 is a screenshot of the content container viewing app interface of FIG. 24 displaying the contents of a content container containing text-related content.

Referring now to FIG. 12, in one configuration, the computing devices 1200 of the content tracking system include a bus 1205 which interconnects major subsystems of the computing device, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), one or more USB devices 1265 (interfaced with a USB controller 1270), and a storage interface 1280. In some instances, the computing device includes one or more sensors 1255 connected to bus 1205 through a sensor controller 1260 and a network interface 1285 (coupled directly to bus 1205).

Bus 1205 allows data communication between central processor 1210 and system memory 1215, which may include read-only memory (ROM) or flash memory (neither shown), and random access memory (RAM) (not shown), as previously noted. The RAM is generally the main memory into which the operating system and logic instructions are loaded. The ROM or flash memory may contain, among other code, the Basic Input-Output system (BIOS) which controls basic hardware operation such as the interaction with peripheral components or devices. Instructions resident with the content tracking system computing devices are generally stored on and accessed via a non-transitory computer readable medium, such as a solid state drive (e.g., fixed disk drive 1275), a hard disk drive, or other storage medium. Additionally, applications may be in the form of electronic signals modulated in accordance with the application and data communication technology when accessed via network interface 1285.

Storage interface 1280, as with the other storage interfaces of, may connect to a standard computer readable medium for storage and/or retrieval of information, such as a fixed disk drive 1275. Fixed disk drive 1275 may be a part of computing device 1200 or may be separate and accessed through other interface systems. Network interface 1285 may provide a direct connection to a remote server computing device via a direct network link to the Internet. Network interface 1285 may provide such connection using wireless techniques, including broadband, digital cellular telephone connection, Cellular Digital Packet Data (CDPD) connection, digital satellite data connection, or the like. In some embodiments, one or more sensors connect to computing device 1200 wirelessly via network interface 1285.

Many other devices or subsystems (not shown) may be connected in a similar manner. Conversely, all of the devices shown in FIG. 12 need not be present to practice the present systems and methods. The devices and subsystems may be interconnected in different ways from that shown in FIG. 12. The aspect of some operations of a system such as that shown in FIG. 12 are readily known in the art and are not discussed in detail in this application. Computer instructions to implement the present disclosure may be stored in a non-transitory computer-readable medium such as one or more of system memory 1215 or fixed disk drive 1275. The operating system provided on computing device 1200 may be, for example, iOS, ANDROID, MS-WINDOWS, UNIX, LINUX, OSX, or another known operating system.

Referring now to FIG. 13 through FIG. 17, in some embodiments, an interfaces, such as a web interface, provides an interface 1300 for querying the generative content registration database. In some instances, one or more of the generative content registration database includes one or more attributes in one or more tables specific to a content type, such as an image type 1400, a video type 1500, an AI source type 1600, an owner type 1700, or the like.

Referring now to FIG. 18 through FIG. 23, in some embodiments, the generative content tracking system includes one or more analytics views, such as, for example, realtime content container creation analytics 1800, generative content source distribution analytics 1900, generative content category analytics 2000, geographical distribution analytics 2100, content container views and generation analytics 2200, view and rating analytics 2300, and the like.

Referring now to FIG. 24 through FIG. 27, in some embodiments, a content container viewing app provides interfaces 2400 for viewing content container content, such as, for example, image-related content 2500, video-related content 2600, text related content 2700, and the like.

Clause 1. A generative content registration system, comprising: a processor; a non-transitory memory coupled to the processor configured to store a generative content registration database comprising generative content registration data; a communication service coupled to a network interface, the communication service configured to receive generative content registration-related service requests; and a registry service communicatively coupled to the processor, the registry service comprising a generative content registration service, wherein the processor is configured to: receive a plurality of generative content-related metadata attribute values; write the plurality of generative content-related metadata attribute values to the generative content registration database; and retrieve the plurality of generative content-related metadata attribute values from the generative content registration database.

Clause 2. The generative content registration system of clause 1, wherein the generative content registration data comprises an association with artificial intelligence generated content.

Clause 3. The generative content registration system of clause 1, wherein the plurality of generative content-related metadata attribute values comprises at least one of: (a) a generative content source provider; (b) a generative content registered owner; (c) a region; (d) a governance attribute; (e) a generative content category; (f) a generative content status; (g) a generative content source status; (h) a linked service; (i) a rating; (j) a rank; (k) a file identifier; (l) a content category; (m) an owner; (n) a sub user; (o) a restriction; (p) a license attribute; or (q) rule.

Clause 4. The generative content registration system of clause 3, wherein the license attribute comprises one or more of: (a) a license name; (b) a license version; (c) a license variation; or (d) a license metadata value.

Clause 5. The generative content registration system of clause 3, comprising an owner registration record comprising one or more of an owner or a source system owner.

Clause 6. The generative content registration system of clause 3, wherein the sub user comprises a source system end user identifier.

Clause 7. The generative content registration system of clause 3, wherein the sub user comprises an API end consumer identifier.

Clause 8. The generative content registration system of clause 3, wherein the sub user comprises a third-party API interface identifier.

Clause 9. A generative content registration system, comprising: a processor; a non-transitory memory coupled to the processor configured to store a generative content registration database comprising generative content registration data; a communication service coupled to a network interface, the communication service configured to transmit generative content registration-related service request responses; and a registry services layer comprising a plurality of registry services communicatively coupled to the processor comprising: a registry administration service; and a content verification service.

Clause 10. The generative content registration system of clause 9, wherein the plurality of registry services comprises a generated content governance service.

Clause 11. The generative content registration system of clause 10, wherein the generated content governance service comprises a governing operation based, at least in part, on one or more of: (a) an associated geographic region; (b) an associated political region; or (c) applicable laws.

Clause 12. The generative content registration system of clause 9, wherein the content verification service comprises one or more of: (a) content verification; (b) content container verification; or (c) content container package verification.

Clause 13. The generative content registration system of clause 12, wherein the content verification service comprises transmitting a verification message indicative of a verification result status.

Clause 14. The generative content registration system of clause 13, wherein the verification result status comprises verifying a first generative content-related metadata attribute value is equal to a second generative content-related metadata attribute value.

Clause 15. The generative content registration system of clause 14, wherein the second generative content-related metadata attribute value is a registration database generative content-related metadata attribute value.

Clause 16. The generative content registration system of clause 15, wherein the first generative content-related metadata attribute value is an embedded generative content-related metadata attribute value.

Clause 17. The generative content registration system of clause 15, wherein the first generative content-related metadata attribute value is a non-embedded generative content-related metadata attribute value.

Clause 18. The generative content registration system of clause 17, wherein the first generative content-related metadata attribute value is a side car file generative content-related metadata attribute value.

Clause 19. The generative content registration system of clause 14, wherein the first generative content-related metadata attribute value is a file package generative content-related metadata attribute value.

Although the described embodiments of the present invention are believed to represent the best mode of the present invention, it should be understood that many described components of the present invention have known functional equivalents. Additionally, orientations, proportions and shapes used within the description may be modified by a person skilled in the art. All such modifications and deviations are intended to be covered by the scope of the invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," "approximately," "nearly," or the like, it will be understood that the particular value forms another aspect. It will be further understood that the endpoints of each of the ranges are significant both in relation to the other endpoint, and independently of the other endpoint.

Conditional language, such as "can," "could," "might," or "may," unless specifically stated otherwise, or otherwise understood within the context as used, is generally intended to convey that certain implementations include or do not include, certain features, elements, and/or steps. Thus, such conditional language is not generally intended to imply that features, elements, and/or steps are in any way required for one or more implementations.

Conjunctive language, such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Several illustrative implementations of the content tracking system have been disclosed. Although this disclosure has been described in terms of certain illustrative implementations and uses, other implementations and other uses, including implementations and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various implementations. All possible combinations and subcombinations of elements and components described herein are intended to be included in this disclosure. No single feature or group of features is necessary or indispensable.

Certain features that are described in this disclosure in the context of separate embodiments can also be implemented in combination in a single embodiment. Conversely, various features that are described in the context of a single implementation also can be implemented in multiple embodiments separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one implementation or example in this disclosure can be combined or used with (or instead of) any other portion of any of the steps, processes, structures, and/or devices disclosed or illustrated in a different implementation, flowchart, or example. The implementations and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any implementations having equivalent elements, modifications, omissions, and/or combinations are also within the scope of this disclosure. Moreover, although certain aspects, advantages, and novel features are described herein, not necessarily all such advantages may be achieved in accordance with any particular implementation. For example, some implementations within the scope of this disclosure achieve one advantage, or a group of advantages, as taught herein without necessarily achieving other advantages taught or suggested herein. Further, some implementations may achieve different advantages than those taught or suggested herein.

Additionally, any methods described herein may be practiced using any device suitable for performing the recited steps.

In summary, various implementations and examples of content tracking system systems and related methods have been disclosed. This disclosure extends beyond the specifically disclosed implementations and examples to other alternative implementations and/or other uses of the implementations, as well as to certain modifications and equivalents thereof. Moreover, this disclosure expressly contemplates that various features and aspects of the disclosed implementations can be combined with, or substituted for, one another. Accordingly, the scope of this disclosure should not be limited by the disclosed implementations described above, but should be determined only by a fair reading of the claims The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

The invention claimed is:

1. A generative content registration system, comprising:
   a processor;
   a non-transitory memory coupled to the processor and configured to store a generative content registration database comprising generative content registration data;
   a communication service coupled to a network interface, the communication service configured to receive and publish generative content registration-related service requests and responses; and
   a registry service communicatively coupled to the processor, the registry service comprising:
      a generative content registration service, and
      a tamper-evident audit log service that records each write operation as an append only, hash-chained entry signed with an asymmetric private key of a registered owner,
   wherein the processor is configured to:
      receive a plurality of generative content-related metadata attribute values, the plurality comprising (i) a persistent cryptographic content identifier generated as a hash of a corresponding content container and (ii) a digital signature created with the registered owners's private key;
      verify the digital signature with a corresponding public key and reject the request if verification fails;
      write the plurality of generative content-related metadata attribute values and the cryptographic content identifier to the generative content registration database together with an audit-log entry; and
      retrieve the plurality of attribute values from the generative content registration database.

2. The generative content registration system of claim 1, wherein the generative content registration data comprises an association with artificial intelligence generated content.

3. The generative content registration system of claim 1, wherein the plurality of generative content-related metadata attribute values comprises at least one of:
   r) a generative content source provider;
   s) a generative content registered owner;
   t) a region;
   u) a governance attribute;
   v) a generative content category;
   w) a generative content status;
   x) a generative content source status;
   y) a linked service;
   z) a rating;
   aa) a rank;
   bb) a file identifier;
   cc) a content category;
   dd) an owner;
   ee) a sub user;
   ff) a restriction;
   gg) a license attribute; or
   hh) rule.

4. The generative content registration system of claim 3, wherein the persistent cryptographic content identifier is stored in the database and embedded into the content container.

5. The generative content registration system of claim 3, comprising an owner registration record comprising one or more of an owner or a source system owner.

6. The generative content registration system of claim 3, wherein the sub user comprises an application-programming-interface (API) source system end-consumer identifier.

7. The generative content registration system of claim 3, wherein the sub user comprises an application-programming-interface end consumer identifier.

8. The generative content registration system of claim 3, wherein the sub user comprises a third-party application-programming-interface identifier.

9. A generative content registration system, comprising:
   a processor;
   a non-transitory memory coupled to the processor configured to store a generative content registration database comprising generative content registration data and a persistent cryptographic content identifier for each registered content container;
   a communication service coupled to a network interface, the communication service configured to transmit generative content registration-related service request responses; and
   a registry services layer comprising a plurality of registry services communicatively coupled to the processor comprising:
      a registry administration service; and
      a content verification service configured to:
         (iv) extract an embedded persistent cryptographic content identifier from a received content container;
         (v) compare the extracted persistent cryptographic content identifier with the persistent cryptographic content identifier stored in the generative content registration database; and
         (vi) generate and transmit a signed verification-result message that indicates whether the comparison in step (ii) is successful or unsuccessful, the message being digitally signed with a private key of the registry administration service.

10. The generative content registration system of claim 9, wherein the plurality of registry services comprises a generated content governance service.

11. The generative content registration system of claim 10, wherein the generated content governance service comprises a governing operation based, at least in part, on one or more of:
   d) an associated geographic region;
   e) an associated political region; or
   f) applicable laws.

12. The generative content registration system of claim 9, wherein the content verification service comprises one or more of:
   d) content verification;
   e) content container verification; or
   f) content container package verification.

13. The generative content registration system of claim 12, wherein the content verification service comprises transmitting a verification message indicative of a verification result status.

14. The generative content registration system of claim 13, wherein the verification result status comprises verifying a first generative content-related metadata attribute value is equal to a second generative content-related metadata attribute value.

15. The generative content registration system of claim 14, wherein the second generative content-related metadata attribute value is a registration database generative content-related metadata attribute value.

16. The generative content registration system of claim 15, wherein the first generative content-related metadata attribute value is an embedded generative content-related metadata attribute value.

17. The generative content registration system of claim 15, wherein the first generative content-related metadata attribute value is a non-embedded generative content-related metadata attribute value.

18. The generative content registration system of claim 17, wherein the first generative content-related metadata attribute value is a side car file generative content-related metadata attribute value.

19. The generative content registration system of claim 14, wherein the first generative content-related metadata attribute value is a file package generative content-related metadata attribute value.

* * * * *